(12) United States Patent
Swager et al.

(10) Patent No.: US 11,658,322 B2
(45) Date of Patent: May 23, 2023

(54) MEMBRANES AND ANION CONDUCTIVE POLYMERS

(71) Applicant: Massachusetts Institute of Technology, Cambridge, MA (US)

(72) Inventors: Timothy Manning Swager, Newton, MA (US); Jeffrey C. Grossman, Brookline, MA (US); Sibo Lin, Arlington, MA (US); Yoonseob Kim, Malden, MA (US); Yanming Wang, Quincy, MA (US); Arthur France-Lanord, Brighton, MA (US); You-Chi Wu, Cambridge, MA (US); Yifan Li, Quincy, MA (US); Yichong Wang, Beijing (CN)

(73) Assignee: Massachusetts Institute of Technology, Cambridge, MA (US)

( * ) Notice: Subject to any disclaimer, the term of this patent is extended or adjusted under 35 U.S.C. 154(b) by 204 days.

(21) Appl. No.: 17/088,519

(22) Filed: Nov. 3, 2020

(65) Prior Publication Data

US 2021/0135265 A1 May 6, 2021

Related U.S. Application Data

(60) Provisional application No. 62/930,513, filed on Nov. 4, 2019.

(51) Int. Cl.
| | |
|---|---|
| *H01M 8/10* | (2016.01) |
| *B01J 47/12* | (2017.01) |
| *B01J 41/07* | (2017.01) |
| *C08J 5/22* | (2006.01) |
| *B01J 41/13* | (2017.01) |
| *H01M 8/1032* | (2016.01) |
| *H01M 8/1027* | (2016.01) |

(52) U.S. Cl.
CPC ........... *H01M 8/1032* (2013.01); *B01J 41/07* (2017.01); *B01J 41/13* (2017.01); *B01J 47/12* (2013.01); *C08J 5/2287* (2013.01); *H01M 8/1027* (2013.01); *H01M 2008/1095* (2013.01)

(58) Field of Classification Search
CPC ............. H01M 8/1032; H01M 8/1027; H01M 2008/1095; B01J 47/12; B01J 41/07; B01J 47/13; C08J 5/2287
USPC .......................................................... 521/27
See application file for complete search history.

(56) References Cited

U.S. PATENT DOCUMENTS

2012/0148773 A1* 6/2012 Parent .................. C08F 8/26
525/333.1
2017/0022323 A1 1/2017 Swager et al.

FOREIGN PATENT DOCUMENTS

WO WO 2019/191225 A1 10/2019

OTHER PUBLICATIONS

Wang et al. 'Synthesis and characterization of crosslinked poly(arylene ether ketone) containing pendant quaternary ammonium groups for anion-exchange membranes', Journal of Membrane Science, 415-416 (2012), pp. 205-212 . (Year: 2012).*
Wang et al. Synthesis and characterization of crosslinked poly(arylene ether ketone) containing pendant quaternary ammonium groups or anion-exchange membranes, Journal of Membrane Science, 415-416 (2012), pp. 205-212. (Year: 2012).*
Zhao et al. "Poly(arylene ether sulfone)s ionomers containing quaternized triptycene groups for alkaline fuel cell", Journal of Power Sources, 218 (2012), pp. 368-374. (Year: 2012).*
Wang et al., Synthesis and characterization of cross-linked poly(arylene ether ketone) containing pendant quaternary ammonium groups for anion-exchange membranes. J Membrane Sci. 2012;415-416:205-212.
Zhao et al., Poly( arylene ether sulfone )s ionomers containing quaternized triptycene groups for alkaline fuel cell. J Power Sources. 2012;218:368-374.
International Preliminary Report on Patentability for International Application No. PCT/US2020/058747, dated May 19, 2022.
Kim et al., Ionic highways from covalent assembly in highly conducting and stable anion exchange membrane fuel cells. J. Am. Chem. Soc. 2019; 141(45): 18152-9.

* cited by examiner

*Primary Examiner* — Michael M. Bernshteyn
(74) *Attorney, Agent, or Firm* — Wolf, Greenfield & Sacks, P.C.

(57) ABSTRACT

A major challenge in the development of anion exchange membranes for fuel cells is the design and synthesis of highly stable (chemically and mechanically) and conducting membranes. Membranes that can endure highly alkaline environments while rapidly transporting hydroxides are desired. A design for using cross-linked polymer membranes is disclosed to produce ionic highways along charge delocalized pyrazolium and homoconjugated triptycenes. The ionic highway membranes show improved performance in key parameters. Specifically, a conductivity of 111.6 mS cm$^{-1}$ at 80° C. was obtained with a low 7.9% water uptake and 0.91 mmol g$^{-1}$ ion exchange capacity. In contrast to existing materials, these systems have higher conductivities at reduced hydration and ionic exchange capacities, emphasizing the role of the highway. The membranes retain more than 75% of initial conductivity after 30 days of alkaline stability test. This effective water management through ionic highways is confirmed by density functional theory and Monte Carlo studies. A single cell with platinum group metal catalysts at 80° C. showed a high peak density of 0.73 W cm$^{-2}$ (0.45 W cm$^{-2}$ from silver-based cathode) and stable performance during 400 h tests.

19 Claims, 39 Drawing Sheets

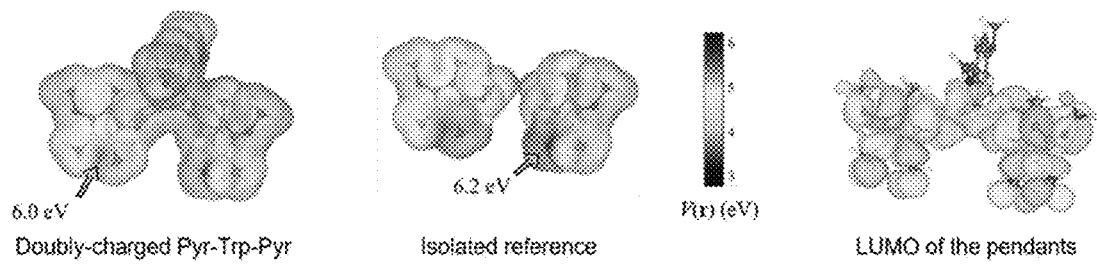
FIG. 4A
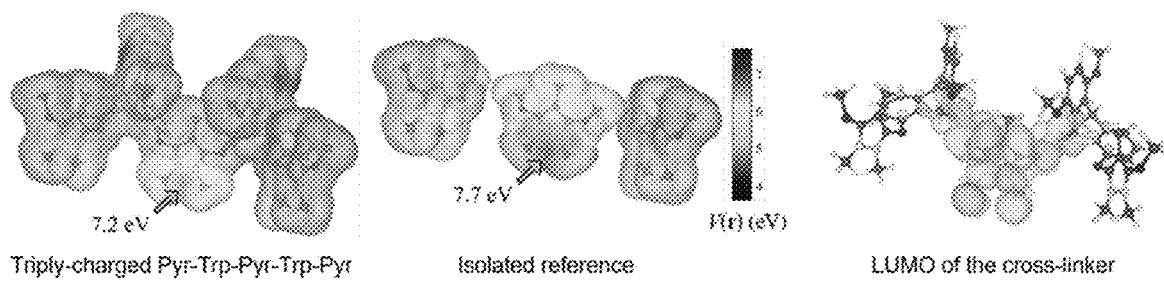
FIG. 4B
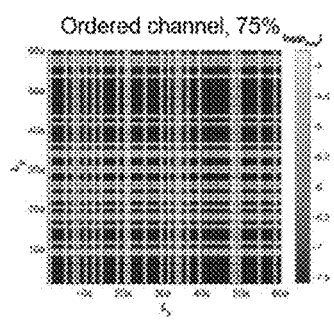    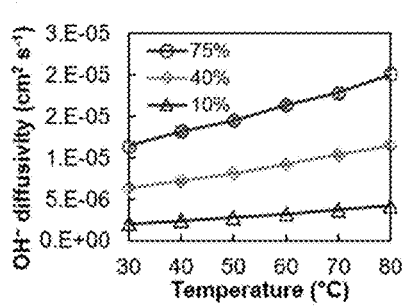    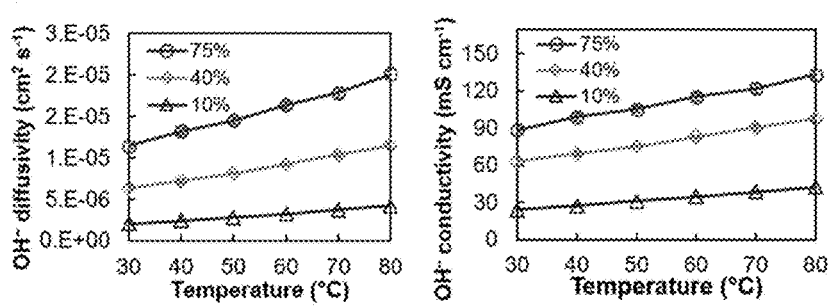
FIG. 4C          FIG. 4D          FIG. 4E p$K_a$ = 39.9

$pK_a = 47.0$

US 11,658,322 B2

MEMBRANES AND ANION CONDUCTIVE POLYMERS

RELATED APPLICATIONS

This application claims priority under 35 U.S.C. § 119(e) to U.S. Provisional Application No. 62/930,513, filed Nov. 4, 2019, and entitled "STABLE, HIGHLY CONDUCTIVE, ANION EXCHANGE POLYMER FILMS," which is incorporated herein by reference in its entirety for all purposes.

TECHNICAL FIELD

Articles and methods involving stable, highly conductive, anion exchange polymer films are generally described.

BACKGROUND

Advances over the last few decades in fuel cell technologies have enabled the production of fuel cell vehicles by major automobile manufacturers. The advantages of fuel cell vehicles include environmental friendliness, long-range on a single fueling, convenient/rapid gas refueling, and compatibility with current fossil fuel infrastructure. Current commercial vehicles use membranes, discrete, thin interfaces that moderates the permeation of chemical species, such as proton exchange membrane fuel cells, and the high power output is the result of efficient platinum-catalyzed reactions and fast ion exchange through fluorocarbon membranes such as Nafion. However, these systems are expensive from both the membrane and catalyst standpoint, which is hindering broader adoption of this technology.

Recently, anion exchange membrane-based fuel cells (AEMFC) that use a cationic polymeric hydroxide-conducting membrane as a separator have gained interest because they function with less expensive metal catalysts. To realize this potential, there are three major issues AEMs may aim to meet. First, fuel cells often operate in nearly 100% humidity level, and this high humidity causes high water uptake and swelling of the charged polymer membranes. Excessive swelling can cause instabilities and loss of performance, and free-standing membranes may need to be stable to these dimensional changes. Second, hydroxide at 60-80° C. operating temperatures, a strong base and nucleophile, degrades some cationic organic membranes. Avoiding degradation is desirable for stable, long-term operation of the fuel cells. Finally, the hydroxide conductivity may need be high (>100 mS cm$^{-1}$) to meet the desired power output to drive an automotive motor.

The design of stable cationic polymer networks for fast anion transport might be solved by chemical principles. There has been progress on these fronts with cross-linked networks to prevent swelling, ether-free networks to impart improved chemical stability, and increasing ion exchange capacity (IEC) to achieve higher conductivity. However, in most cases, these solutions require trade-offs in properties. For example, cross-linking of hydrocarbon backbones can present challenges, and can give reduced IEC. Similarly increasing IEC often results in increased water uptake and polymer swelling. Designs that address the three AEM criteria mentioned above simultaneously without compromises are rare. Accordingly, improved articles and methods are needed.

SUMMARY

The subject matter of the present invention involves, in some cases, interrelated products, alternative solutions to a particular problem, and/or a plurality of different uses of one or more systems and/or articles.

In one aspect, a membrane is described that comprises a cationic polymer, an anion configured to move within the cationic polymer, and a crosslinker. In some embodiments the crosslinker at least partially crosslinks the cationic polymer. In some embodiments, a water uptake of the membrane is no more than 50%.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 4A-4D show computational studies with DFT analysis of charge delocalization in triptycene-connected pyrazolium cations with FIG. 4A showing electrostatic potential (ESP) mapped on the 0.01 e·Å$^{-3}$ isodensity surface of model structures where two pyrazoliums (Pyr) are connected to a triptycene (Trp), and the corresponding non-cross-linked reference and FIG. 4B showing the lowest unoccupied molecular orbital (LUMO) of the chemical structure in FIG. 4A and FIG. 4C with ESP mapped on the 0.01 e·Å$^{-3}$ isodensity surface of model structures where three pyrazoliums and two triptycenes connected in an alternating way and the corresponding non-cross-linked reference with FIG. 4A and FIG. 4C showing arrows and associated numbers pointing at the maximum value of the ESP map and with the ESP projected on an isosurface of the electron density (0.01 e·Å$^{-3}$) where FIG. 4D shows the LUMO of the chemical structure in FIG. 4D where the end of all methyl or methoxy groups are supposed to have phenyls but are omitted for the convenience of calculation, according to one set of embodiments;

FIGS. 4C-4H show 2D Lattice Monte Carlo (2D-LMC) studies of ion hopping, with FIG. 4E showing an anion hopping probability distribution map for a polymer network constructed by orderly placed cross-linkers for 75% degree of cross-linking and where FIGS. 4C-4E showing the calculated OH$^-$ diffusivity and conductivity at different degrees of cross-linking as a function of temperature, respectively with FIG. 4H showing the anion hopping probability distribution map for a polymer network constructed by randomly placed cross-linkers for 10% degree of cross-linking, and where FIGS. 4G-4H showing the calculated OH$^-$ diffusivity and conductivity at different degrees of cross-linking as a function of temperature, respectively, according to some embodiments;

FIGS. 21A-2B show energy-dispersive X-ray (EDX) spectroscopy analysis of pyrazolium cross-linked poly(triptycene ether sulfone), PX75-T50, and PX10-T50, respectively, where no observation of F (0.68 keV) and Cl (2.6 keV) showing nearly 100% anion exchange from BF$_4^-$ to OH$^-$, and also shows substitution reaction for cross-linking, according to one set of embodiments;

DETAILED DESCRIPTION

Figure 1A:
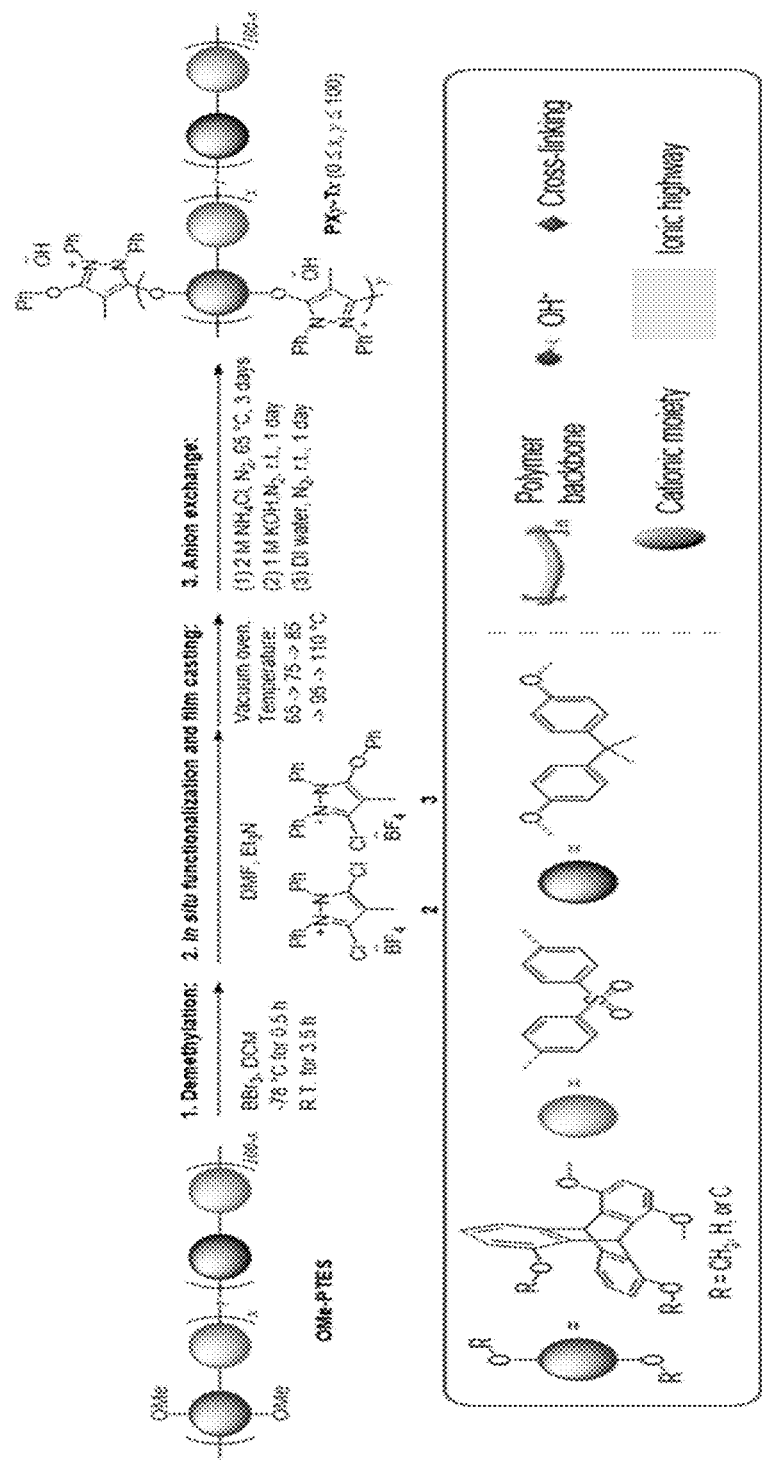
FIG. 1A shows the design of ionic highway through a pyrazolium cross-linked triptycene polymer showing a schematic of conversion from poly(methoxy-triptycene ether sulfone) (OMe-PTES) to pyrazolium cross-linked poly(triptycene ether sulfone) (PXy-Tx), via demethylation, in situ functionalization and film casting, according to some embodiments.

A major challenge in the development of anion exchange membranes for fuel cells is the design and synthesis of highly stable (e.g., chemically stable, mechanically stable) and conducting membranes. Membranes that can endure highly alkaline environments while rapidly transporting hydroxides can be desired. Here, in some embodiments, a design using cross-linked polymer membranes is presented to produce ionic highways along charged delocalized pyrazolium and homoconjugated triptycenes. In some cases, these ionic highway membranes show improved performance in key parameters. In some cases specifically, a conductivity of 111.6 mS cm$^{-1}$ at 80° C. was obtained with a low 7.9% water uptake and 0.91 mmol g$^{-1}$ ion exchange capacity. In contrast to certain existing materials, the present systems have higher conductivities at reduced hydration and ionic exchange capacities emphasizing the role of the highway. The membranes can retain more than 75% of initial conductivity after 30 days of alkaline stability test. This effective water management through ionic highways is confirmed by density functional theory and Monte Carlo studies. In one embodiment, a single cell with platinum group metal catalysts at 80° C. showed a high peak density of 0.73 W cm$^{-2}$ (0.45 W cm$^{-2}$ from silver-based cathode) and stable performance during 400 h tests.

Herein, in some embodiments, highly conducting anion exchange membranes (AEMs) that are mechanically and chemically stable with charge-delocalized cations are described.

In some embodiments, the membrane comprises a cationic polymer. As used in this disclosure, a cationic polymer has its ordinary meaning in the art to refer to polymers that are ionized or ionizable such that the net or total charge of the polymer is positive. In some certain embodiments, the cationic polymer comprises a poly(triptycene ether sulfone). Without wishing to be bound by any particular theory, the triptycene structure can advantageously provide free volume in the structure (e.g., within the membrane). However, other cationic polymers, other than triptycene-based polymers, that include other rigid bicyclic ring structures that promote free volume may also be useful in promoting this property. Non-limiting examples include pentiptycenes and benzonorborenes. Other cationic polymers are possible.

In some embodiments, the cationic polymer may be at least partially crosslinked. In some cases, the polymer is fully crosslinked. In some embodiments, the degree of crosslinking is between 0% and 100%. In some embodiments, the cationic polymer is at least 10% crosslinked, at least 20% crosslinked, at least 30% crosslinked, at least 40% crosslinked, at least 50% crosslinked, at least 60% crosslinked, at least 70% crosslinked, at least 75% crosslinked, at least 80% crosslinked, at least 90% crosslinked, or at least 95% crosslinked by the crosslinker. In some embodiments, the cationic polymer is no greater than 95% crosslinked, no greater than 90% crosslinked, no greater than 80% crosslinked, no greater than 75% crosslinked, no greater than 70% crosslinked, no greater than 60% crosslinked, no greater than 50% crosslinked, no greater than 40% crosslinked, no greater than 30% crosslinked, no greater than 20% crosslinked, or no greater than 10% crosslinked by the crosslinker. Combinations of the above-referenced ranges are also possible (e.g., at least than 10% crosslinked and no greater than 75% crosslinked by the crosslinker). Other ranges are possible. Controlling the degree of crosslinking can advantageously tuned the anionic conductivity and/or physical and mechanical properties of the membrane (e.g., stiffness, swelling, volume). In some embodiments, the degree of crosslinking can be controlled by the reaction stoichiometry of the crosslinker.

In some cases, the crosslinker is also cationic (i.e., addition to the cationic polymer). For example, in some embodiments, the crosslinker comprises a pyrazolium ion (e.g., a pyrazolium cation) or a salt thereof. In some embodiments, the crosslinker can be a cationic species introduced as pendants and crosslinking elements by a reaction of dichloro- and monochloro-pyrazolium ions with high free volume polymer poly(hydroxy-triptycene ether sulfone). For example, a series of pyrazolium cross-linked poly(triptycene ether sulfone)s were studied (PXy-Tx; 0≤x, y≤100, y denotes the intended percent of cross-linking and x denotes the percent of triptycene repeats in the polymer (FIG. 1)). Reactions with the dichloro-pyrazolium causes cross-link and addition of monochloro-pyrazolium gives pendant cations. Advantageously, the cross-linking may enhance the mechanical properties and the ionic highways form as a combination of delocalized pyrazolium cations in homoconjugation with triptycenes. In some cases, the utility of these AEM-containing ionic highways in hydroxide ion conducting fuel cells was demonstrated and show high power output. In some embodiments, the cations (e.g., of the cationic polymer and/or the crosslinker) are configured to provide a substantially continuous charged pathway for the transport of ions (e.g., anions).

In some embodiments, a cationic ring (e.g., a pyrazolinum ring) of the cationic polymer and/or the crosslinker is fully substituted. As described herein, a "fully substituted" ring refers to a ring structure of chemical species in which the unsubstituted ring contains on or more C—H bonds. Conversely a substituted ring contains one or more C—H bonds in which one or more H atoms of the C—H bond has been replaced with a substituent (e.g., —$CH_3$, —$CH_2CH_3$, $CF_3$). A "fully substituted" ring corresponds to a ring in which all of the C—H bonds of the ring of the chemical species have been replaced with a substituent. For example, in the case of a pyrazolium ring, which can contain up to three C—H groups within the pyrazolium ring, a fully substituted ring corresponds to where each of the four C—H have had their H atom replaced with a substituent. However, in other embodiments, cationic ring of the cationic polymer and/or the crosslinker is partially substituted or not substituted as this disclosure is not so limited.

It will be appreciated that the above groups and/or compounds (e.g., a cationic ring), as described herein, may be substituted with any number of substituents or functional moieties. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms. Furthermore, this invention is not intended to be limited in any manner by the permissible substituents of organic compounds. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, alkyl, aralkyl, alkenyl, alkynyl, cycloalkyl, hydroxyl, alkoxyl, amino, azide, nitro, halogen, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, nitrido, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

While the crosslinker may comprise a pyrazolium ion or a salt thereof, other crosslinking agents, alternatively or additionally, may be included in the membranes described herein. Examples of other crosslinkers are nitrenes, carbenes, diazoniums, acid chlorides, sulfonyl chlorides, disulfides, alkenes, acrylates, alkynes, azides, and peroxides, without limitation. While in some embodiments, the crosslinker may be cationically charged, in other embodiments, the crosslinker is anionic or neutral.

Ionic Highways for Anion Exchange Membrane

The present disclosure describes membranes including cationic polymers that, in some embodiments, are crosslinked. Crosslinker of the cationic polymers may form passages (e.g., passageways tunnels, channels, pathways or the like) through which anions may travel. These passages are termed "ionic highways" and describe portions formed by the crosslinked cationic polymer through which anions. Examples of anions that can move through these ionic highways are described below and elsewhere herein.

In some embodiments, charge delocalization may be present throughout the cationic polymer and/or the crosslinked cationic polymer. Without wishing to be bound by theory, charge delocalization of cations can be a way to reduce reactivity with nucleophilic and basic anions (e.g., hydroxide anions). In some embodiments, this delocalization is achieved by cationic crosslinkers (e.g., in the pyrazolium cations) by π-bonding and lone pair electrons. Other resonance-stabilized cations such as guanidiniums, imidazoliums, and pyridiniums are known to have alkaline stability and may also be including in the cationic polymer and/or the crosslinker. However, although there are considerable efforts in creating high-performing AEMs, certain existing systems have not pursued structures that assemble in a way that creates ionic highways from a molecular level.

Figure 1B:
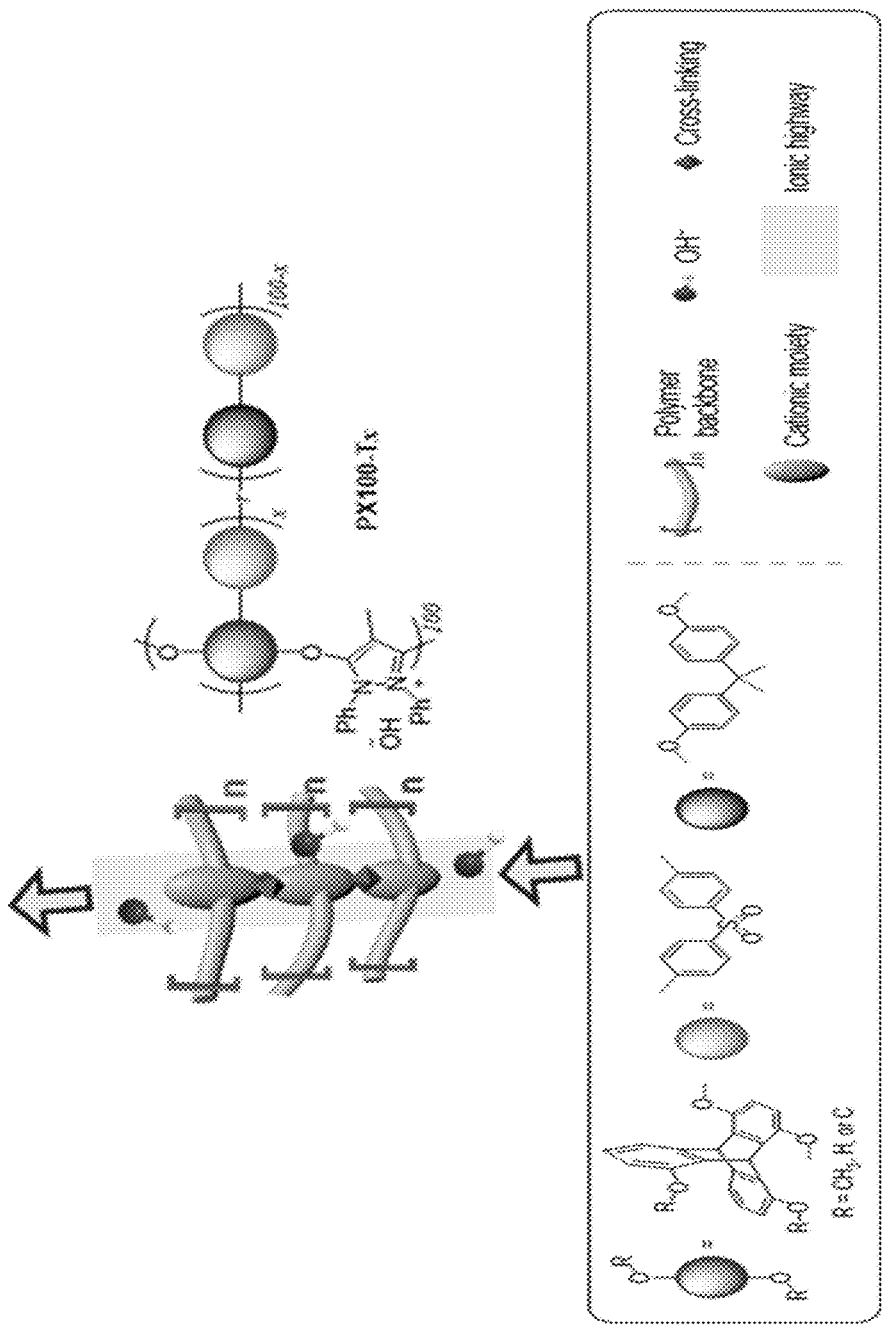
FIG. 1B is a schematic illustration for a case of 100 percent degree of cross-linking and where anion transport is facilitated through delocalized cationic charges of pyrazoliums over triptycene and homoconjugation in the triptycene, according to one set of embodiments.
Figure 1C:
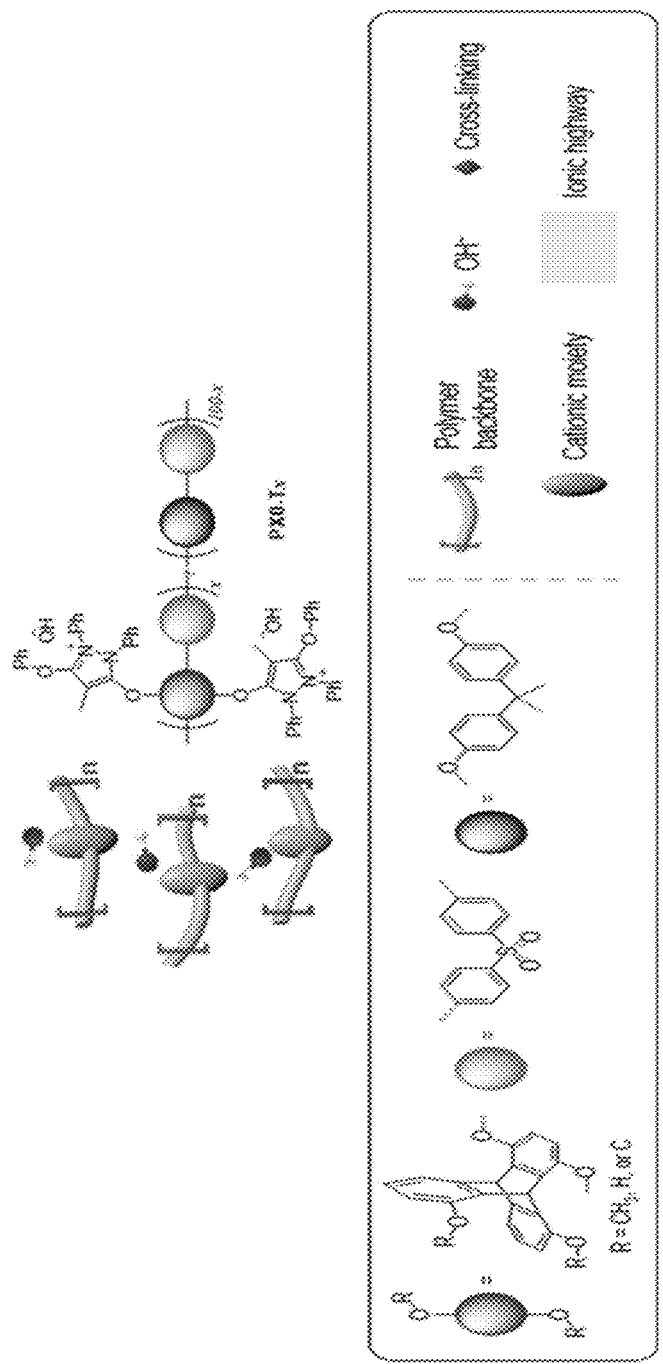
FIG. 1C is a schematic for a case of 0 percent degree of cross-linking where anions would face a much higher activation energy for transport, according to one set of embodiments.
Figure 2:
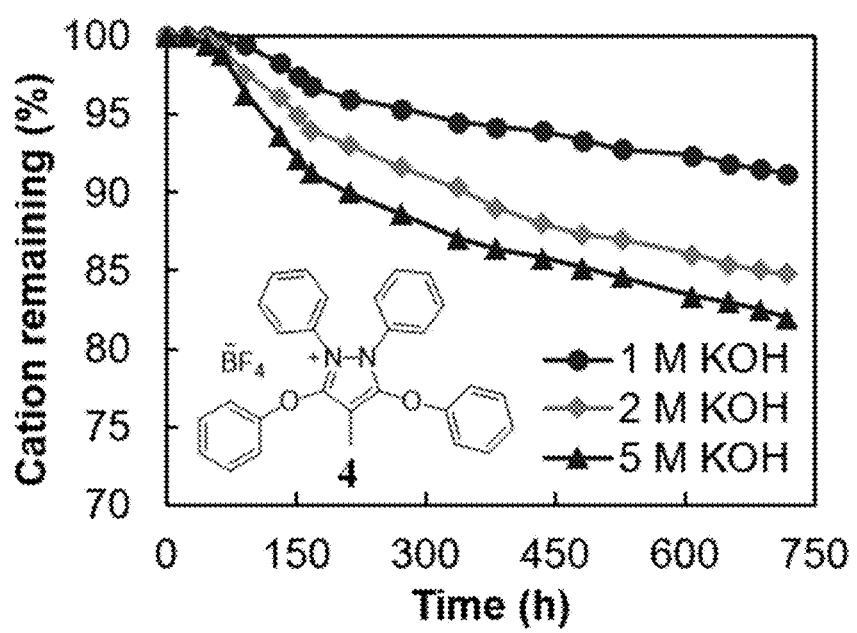
FIG. 2 shows the long-term alkaline stability of 4 at 80° C., where the percent remaining of 4 in 1 M, 2 M, and 5 M KOH solution at 80° C., determined by $^1$H NMR spectroscopy relative to an internal standard is shown, according to some embodiments.

In some embodiments, three design criteria are described, each addressing certain challenges, under a theme of creating an ionic highway. First, preventing high water uptake and swelling could be addressed by constructing a crosslinked polymer network. Installing cations (e.g., pyrazolium) as the cross-linkers can be a preferred strategy, as it balances ion exchange capacity (IEC) and mechanical stability. Second, fully substituted cationic rings can be selected to avoid reactive C—H groups. In some embodiments, the pKa of the cationic ring of the cationic polymer and/or crosslinker is at least 16. In some such embodiments, this may advantageously prevent or avoid reactive C—H groups. Experimental and theoretical studies have shown that deprotonation of the cation rings is a major degradation mechanism and, advantageously, fully substituted ring structures should therefore have improved alkaline stability. Third, the assembly of an ionic highway could have a higher conductivity (e.g., ionic conductivity) by lowering the activation barriers for ion transport. These collective efforts create channels of aligned cation rings by cross-linking, and, in some cases, homo-conjugation to the triptycenes to help to further delocalize the charge (FIG. 1).

The membranes described herein may include one or more anionic species (e.g., one or more anions). In some embodiments, the anionic species is configured to move within the cationic polymer (e.g., a passage, an ionic highway of the cationic polymer). In some embodiments, the anion comprises a hydroxide anion ($OH^-$). However, any suitable anion may be used provided it can be configured to move within the cationic polymer. Non-limiting examples of anions that can be used include fluoride ($F^-$), chloride ($Cl^-$), bromide ($Br^-$), iodide ($I^-$), cyanide ($CN^-$), tetrafluoroborate ($BF_4^-$), hexafluorophosphate ($PF_6^-$), sulfate ($SO_4^{2-}$), sulfite ($SO_3^{2-}$), nitrate ($NO_3^-$), nitrate ($NO_2^-$), phosphate ($PO_4^{3-}$), and phosphite ($PO_3^{3-}$). Other non-limiting examples of anions include formate, carbonate, acetate, and oxalate. Other anions are possible as this disclosure is not so limited.

The anion of the membrane may be of a particular conductivity (e.g., ionic conductivity). In some embodiments, the conductivity of the anion is at least 5 mS $cm^{-1}$, at least 10 mS $cm^{-1}$, at least 15 mS $cm^{-1}$, at least 20 mS $cm^{-1}$, at least 25 mS $cm^{-1}$, at least 30 mS $cm^{-1}$, at least 40 mS $cm^{-1}$, at least 50 mS $cm^{-1}$, at least 75 mS $cm^{-1}$, at least 100 mS $cm^{-1}$, at least 150 mS $cm^{-1}$, at least 200 mS $cm^{-1}$, at least 250 mS $cm^{-1}$, at least 300 mS $cm^{-1}$, at least 350 mS $cm^{-1}$, at least 400 mS $cm^{-1}$, at least 450 mS $cm^{-1}$, or at least 500 mS $cm^{-1}$. In some embodiments, the conductivity of the anion is no greater than 500 mS $cm^{-1}$, no greater than 450 mS $cm^{-1}$, no greater than 400 mS $cm^{-1}$, no greater than 350 mS $cm^{-1}$, no greater than 300 mS $cm^{-1}$, no greater than 250 mS $cm^{-1}$, no greater than 200 mS $cm^{-1}$, no greater than 150 mS $cm^{-1}$, no greater than 100 mS $cm^{-1}$, no greater than 75 mS $cm^{-1}$, no greater than 50 mS $cm^{-1}$, no greater than 40 mS $cm^{-1}$, no greater than 30 mS $cm^{-1}$, no greater than 25 mS $cm^{-1}$, no greater than 20 mS $cm^{-1}$, no greater than 15 mS $cm^{-1}$, no greater than 10 mS $cm^{-1}$, or no greater than 5 mS $cm^{-1}$. Combinations of the above-referenced ranges are also possible (e.g., at least 5 mS $cm^{-1}$ and no greater than 500 mS $cm^{-1}$). Other ranges are possible.

Designed Monomers and Polymers and In Situ Membrane Preparations

Figure 7:
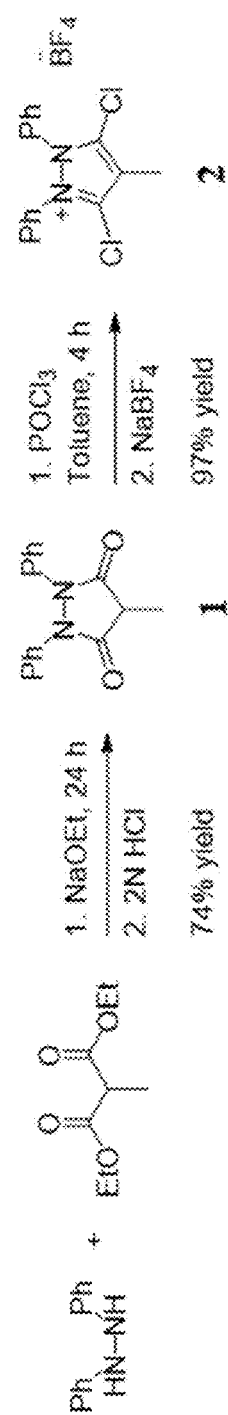
FIG. 7 is a synthetic scheme for 4-methyl-3,5-dichloro-1,2-diphenyl-pyrazolium tetrafluoroborate (2), according to certain embodiments.
Figure 10:
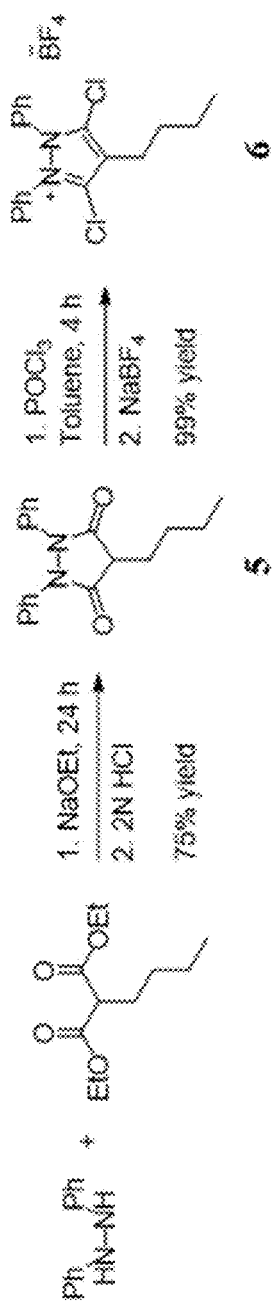
FIG. 10 is a synthetic scheme for 4-butyl-3,5-dichloro-1,2-diphenyl-pyrazolium tetrafluoroborate (6), according to certain embodiments.

In some cases, relatively stable cationic rings were generated from 3,5-dichloropyrazolium, which had not been previously studied in the context of AEMs. In some cases, efforts were guided by density functional theory (DFT) calculations of the pKa value of alpha methyl proton of 4-methyl-3,5-diphenoxy-1,2-diphenyl-pyrazolium tetrafluoroborate (4) and the alpha methylene of 4-butyl-3,5-diphenoxy-1,2-diphenyl-pyrazolium tetrafluoroborate (7). These calculations reveal pKas of 4 and 7 are 39.9 and 47.0, respectively (FIG. 15, FIG. 16), and both represent particularly high values. The five-membered cationic dichloro-alkyl-diphenyl pyrazolium tetrafluoroborate was synthesized by as described elsewhere herein (FIG. 7 and FIG. 10).

Figure 9:
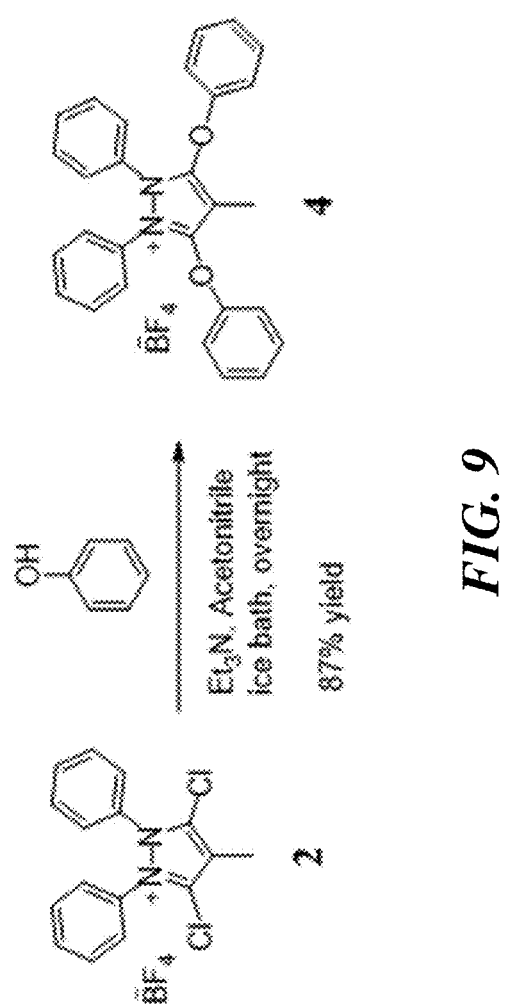
FIG. 9 is a synthetic scheme for 4-methyl-3,5-diphenoxy-1,2-diphenyl-pyrazolium tetrafluoroborate (4), according to certain embodiments.
Figure 11:
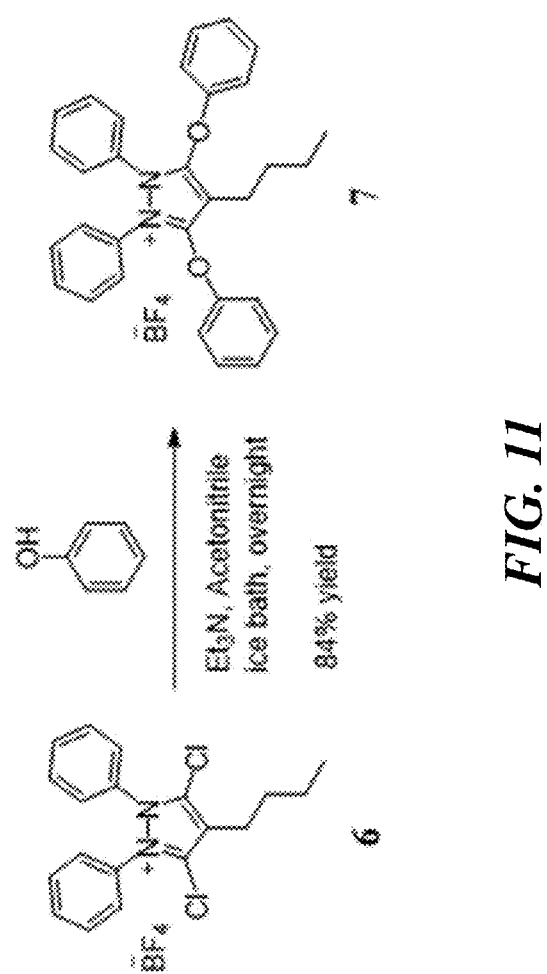
FIG. 11 is a synthetic scheme for 4-butyl-3,5-diphenoxy-1,2-diphenyl-pyrazolium tetrafluoroborate (7), according to certain embodiments.
Figure 17:
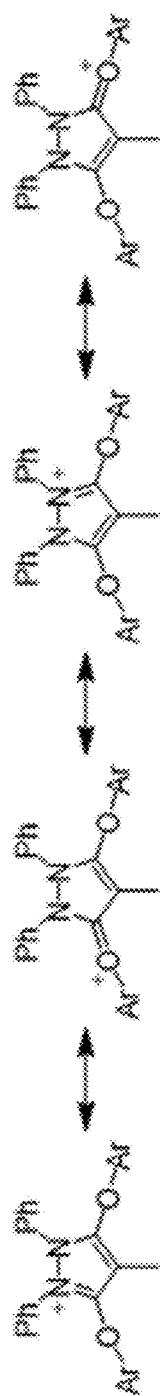
FIG. 17 shows resonance structures of 7 donor substituted pyrazolium, according to some embodiments.

In some cases, the preparation of crosslinkers is described. In some cases, a two-step procedure from commercial materials resulted in 4-methyl-3,5-dichloro-1,2-diphenyl-pyrazolium tetrafluoroborate (2) and 4-butyl-3,5-dichloro-1,2-diphenyl-pyrazolium tetrafluoroborate (6) with high overall yields (>72%). In some such cases, the cationic nature of these intermediates made them excellent substrates for nucleophilic aromatic substitution of the chlorides with oxygen- or nitrogen-based nucleophiles. Reactions with phenol resulted in 4 and 7 which were used for alkaline stability tests (FIG. 9 and FIG. 11). The r-electron donating phenoxy groups provide additional stabilization of the cationic pyrazolium groups. For the simplest substituted pyrazolium, at least 4 different resonance structures can be drawn with all atoms in a preferred octet resonance structure (FIG. 17).

Figure 8:
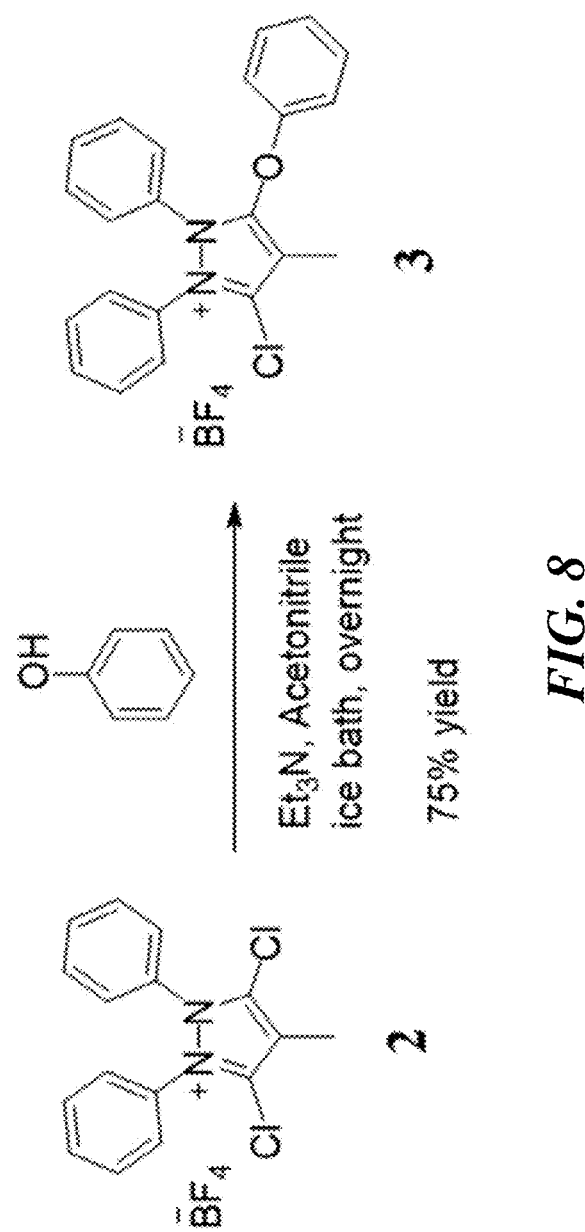
FIG. 8 is a synthetic scheme for 4-methyl-3-chloro-5-phenoxy-1,2-diphenyl-pyrazolium tetrafluoroborate (3), according to certain embodiments.

The stability of crosslinked cationic polymers can be determined. For example, the alkaline stability of 4 and 7, was tested by in situ NMR monitoring solutions in 1, 2, and 5 M KOH at 80° C. using an internal standard. Periodically, the solutions were analyzed by $^1H$ NMR spectroscopy to determine key cation signals relative to an internal standard. This set of tests showed high stability of 4 and 7 under alkaline conditions: more than 91, 85, and 82% of the 4 and 93, 88, and 84% of the 7 persist after heating at 80° C. in 1, 2, and 5 M KOH solutions over 30 days (FIG. 2 and FIGS. 15A-15C). It should be emphasized that the NMR spectra remain relatively clean and there were no clear decomposition products formed. Although 7 showed slightly higher alkaline stability (FIGS. 16A-16C, 16E), methyl pyrazolium, 4, was used for further studies. Specifically, more thermal mobility was expected with butyl pyrazolium (the melting temperature of 4 and 7 are 216-218 and 148-150° C., respectively) and potentially lower conductivity with longer butyl chains. 4-methyl-3-chloro-5-phenoxy-1,2-diphenyl-pyrazolium tetrafluoroborate (3) (FIG. 8) was synthesized, which could be used to graft cations onto polymers without introducing crosslinking that occurs by reaction with dichloro-pyrazolium (2). Hence, by simply changing the ratio between 2 and 3, the degree of cross-linking in the membrane could be changed. Additionally, 3 adds one cation for every reactive hydroxyl on the polymer, wherein 2 adds one cation for every two reactive hydroxyls. Hence the ratio of these reactants also controls the IEC.

Figure 12:
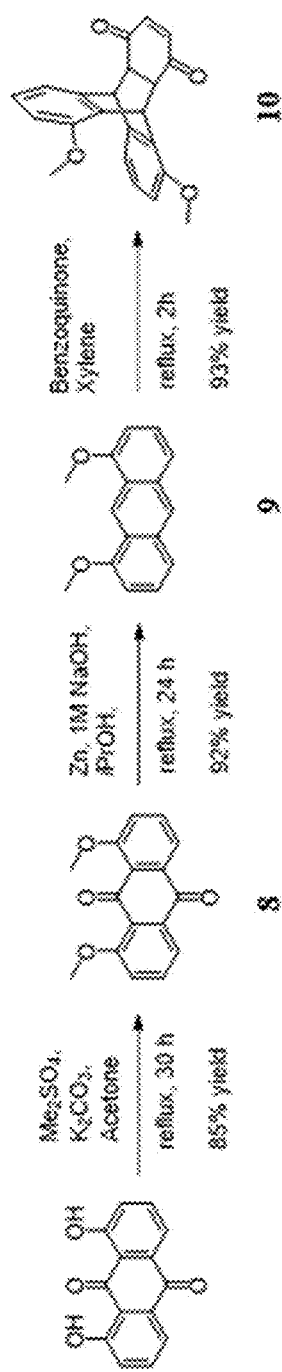
FIG. 12 is a synthetic scheme for 1,8-dimethoxy-benzenoanthracene-13,16-dione (10), according to certain embodiments.
Figure 13:
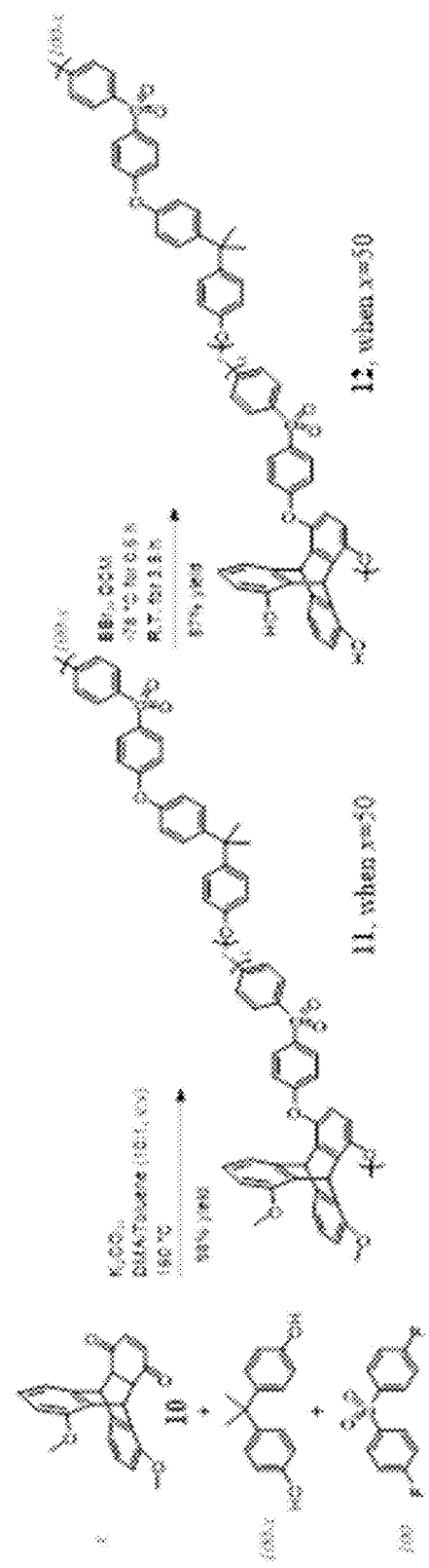
FIG. 13 is a synthetic scheme for poly(hydroxy-triptycene ether sulfone), according to certain embodiments.
Figure 14:
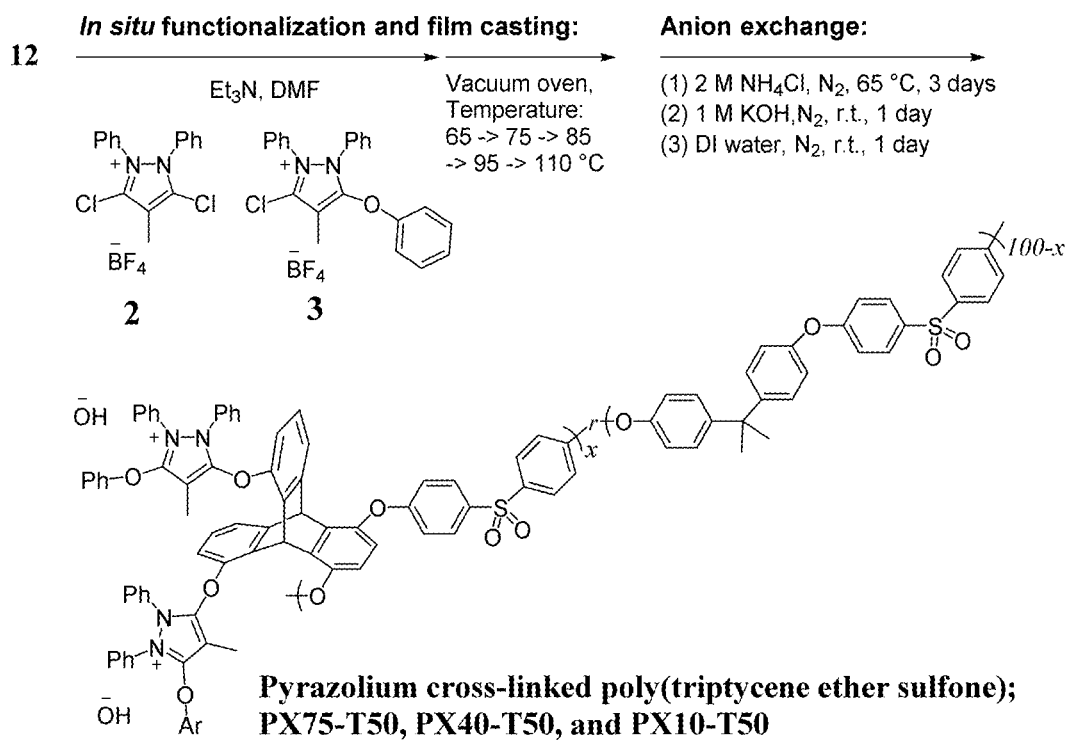
FIG. 14 is a scheme for in situ preparation of pyrazolium cross-linked poly(triptycene ether sulfone) membranes, according to some embodiments.
Figure 15A:
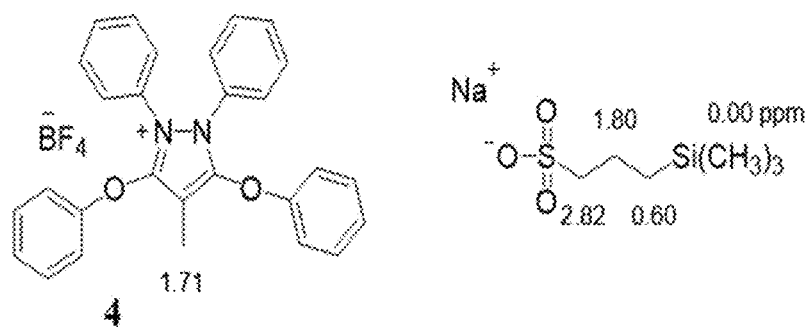
FIGS. 15A-15C shows alkaline stability of (4) showing $^1$H NMR spectra of (4) over 30 days dissolved in a basic CD$_3$OD solution at 80° C. (1 M KOH, [KOH]/[4]=20 with an internal standard (TMS(CH$_2$)$_3$SO$_3$Na) with FIC. 15C showing the intensity increased extract from "t=30 d, >91% remaining" in FIG. 15B, according to one set of embodiments.
Figure 15B:
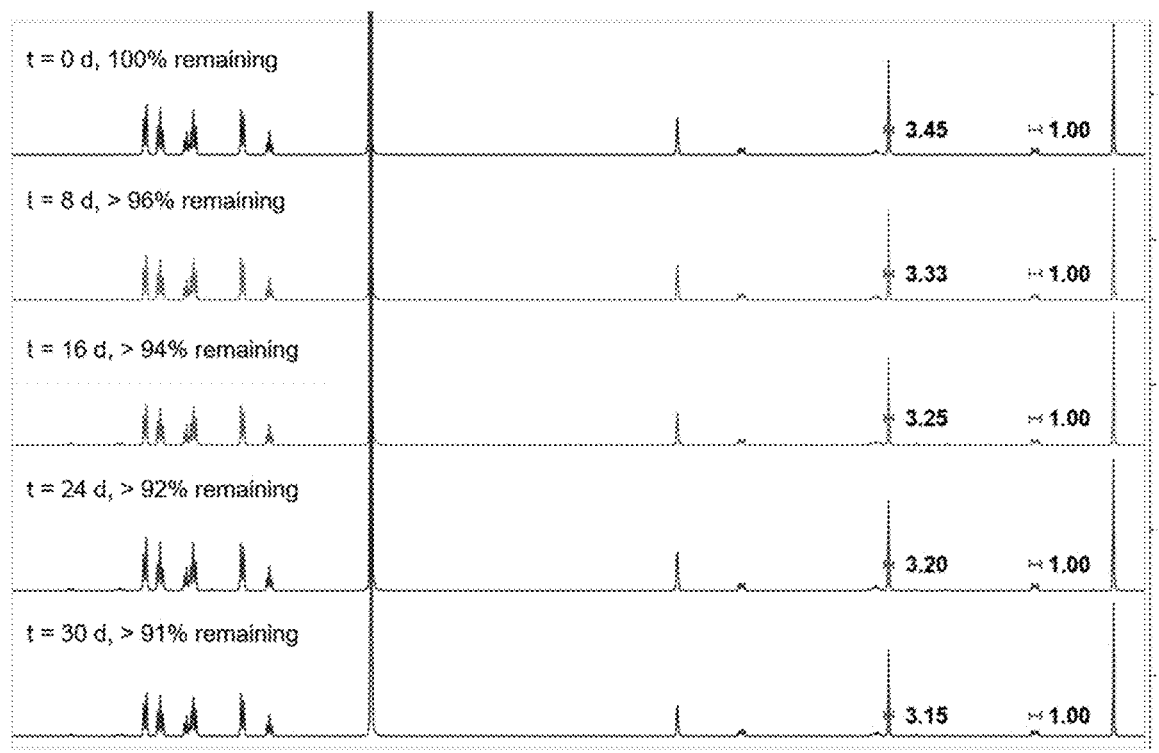
Figure 15C:
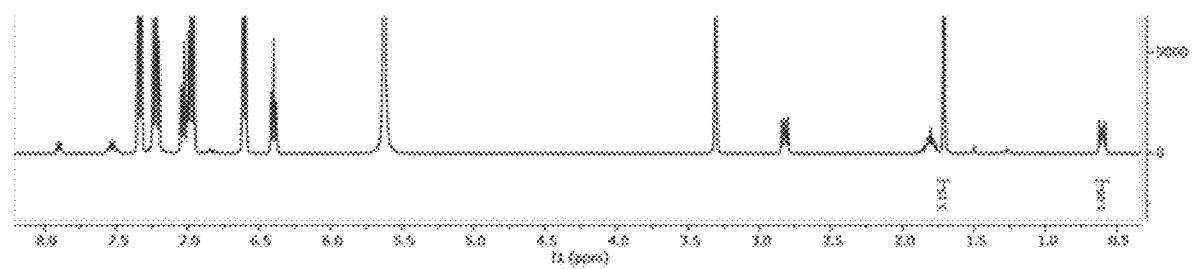
Figure 15D:
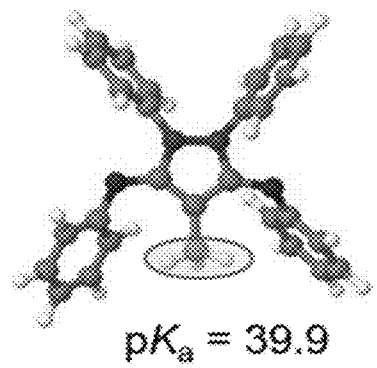
FIG. 15D shows the predicted pKa value of alpha protons of (4), according to one set of embodiments.
Figure 16A:
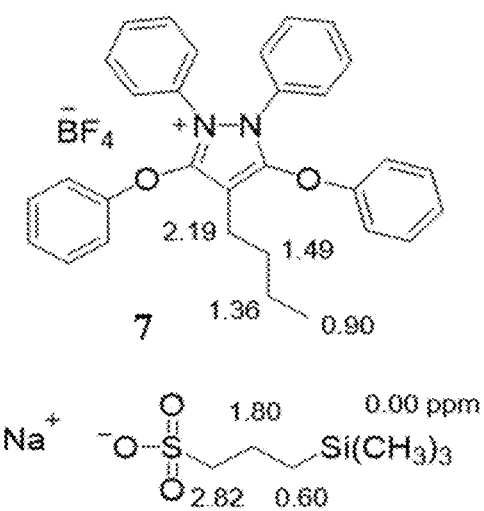
FIGS. 16A-16C show the $^1$H NMR spectra of (7) over 30 days dissolved in a basic CD$_3$OD solution at 80° C. (1 M KOH, [KOH]/[7]=20 with an internal standard (TMS(CH$_2$)$_3$SO$_3$Na) with FIG. 16C showing the intensity increased extract from "t=30 d, >93% remaining" relative to FIG. 16B, according to one set of embodiments.
Figure 16B:
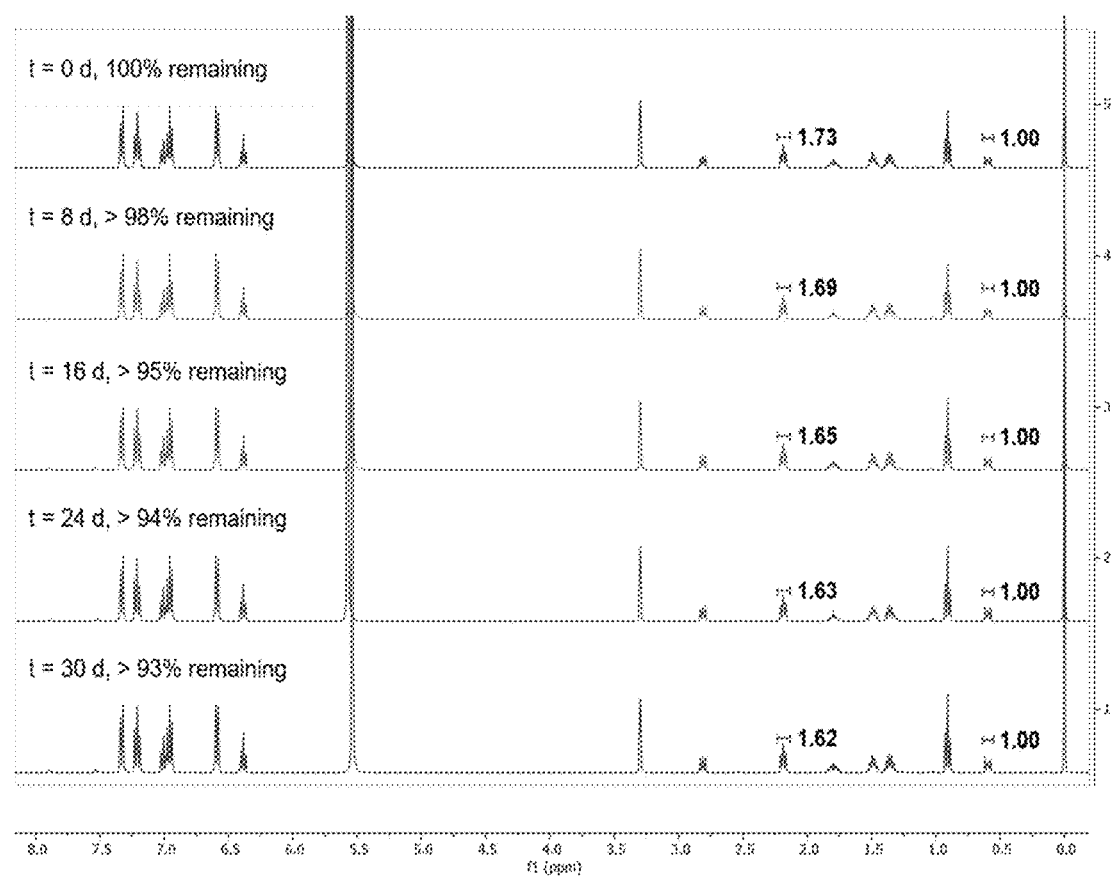
Figure 16C:
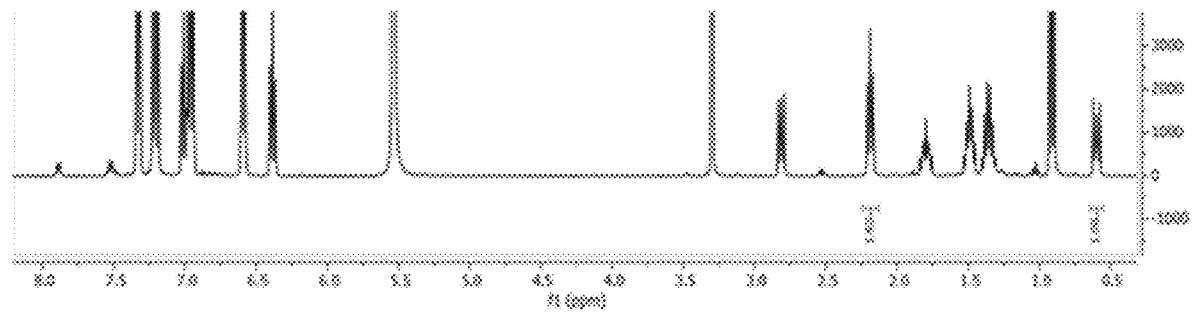
Figure 16D:
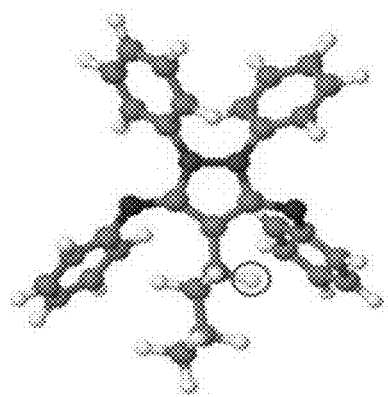
FIG. 16D shows the predicted pKa value of alpha protons of 7, according to one set of embodiments.
Figure 16E:
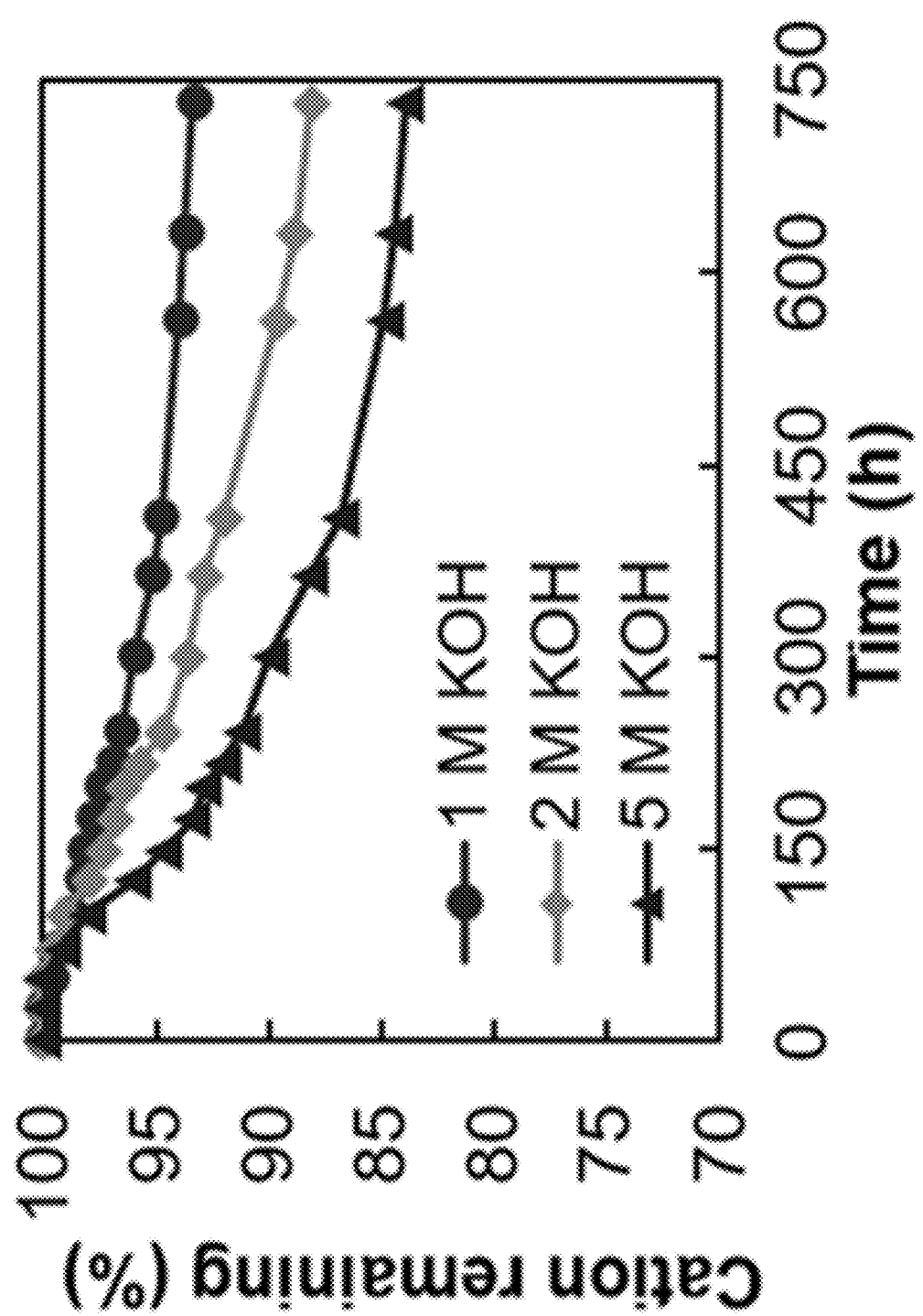
FIG. 16E shows the percent remaining of (7) in 1 M, 2 M, and 5 M KOH solution at 80° C., determined by $^1$H NMR spectroscopy relative to an internal standard, according to certain embodiments.

As mentioned above, in some embodiments, the cationic polymer comprises a poly(triptycene ether sulfone). For example, as a core polymer structure, triptycene-containing poly(ether sulfone) was investigated, which has been previously shown to produce molecularly defined porosity (free volume) and facilitated ion transport while promoting solubility and enhancing mechanical properties. In this case, modified triptycenes were introduced that could present a free hydroxyl group on each pendant benzene ring. This structure enables attachment of pyrazolium groups by nucleophilic substitution as pendants or as a cross-linking group (FIG. 1). In some embodiments, the proximate nature of the hydroxyl groups is important to the creation of the ionic highway. The polymer synthesis began with 1,8-dimethoxy-benzenoanthracene-13,16-dione (10) (FIG. 12), wherein the hydroxyls are protected as methoxy groups. Monomer 10 was synthesized in three steps from commercially available and low-cost 1,8-dihydroxyanthraquinone with a high overall yield of 72.7%. Copolymers were synthesized using 10, with Bisphenol A and bis(4-fluorophenyl) sulfone, via nucleophilic aromatic substitution ($S_NAr$), with $K_2CO_3$ as a base and dimethylacetamide as a solvent (FIG. 13). In some embodiments, bisphenol A was introduced to lower $T_g$ of the resulting polymer for increased film compliance. The $S_NAr$ reaction produced high molecular weight poly(methoxy-triptycene ether sulfone), OMe-PTES (x=50; Mn: 106.9 kDa, Mw: 249.9 kDa, and PDI: 2.33) (FIG. 18; molecular weight information on polymer of x=75 is also included). Subsequently, the OMe-PTES was quantitively demethylated ($^1H$ NMR, FIG. 13) by reaction with $BBr_3$ at −78° C. to yield poly(hydroxy-triptycene ether sulfone) (OH-PTES).

It is noted that in some embodiments, the polymers with the highest molecular weight were used. Without wishing to be bound by any theory, this high molecular weight enabled the formation of flexible freestanding films, even though high $T_g$ triptycene monomers and a high degree of cross-linking contributed to some stiffness.

Figure 20:
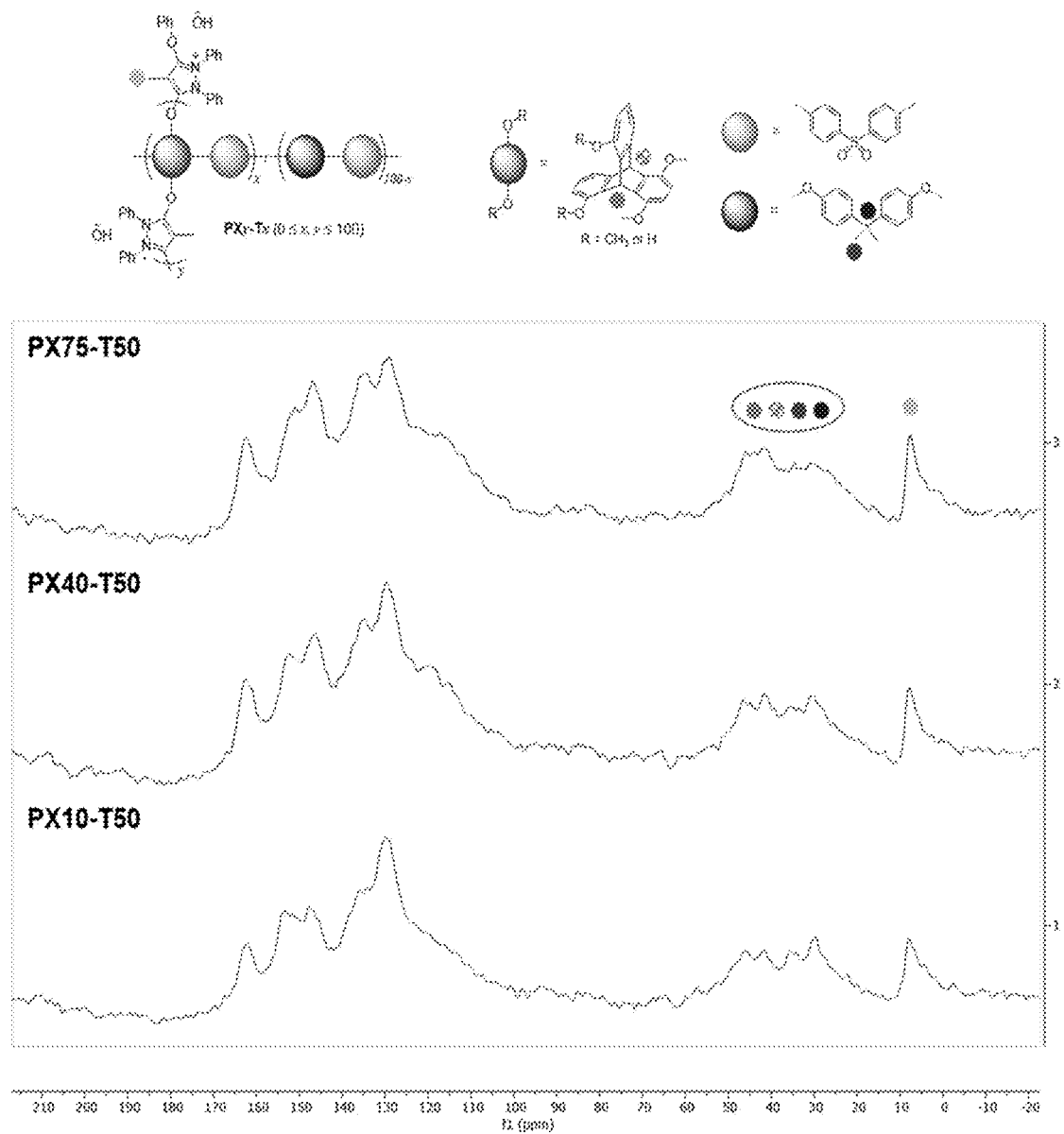
FIG. 20 shows the $^{13}$C magic-angle spinning NMR data of membranes, PX75-T50, PX40-T50, and PX10-T50, where the aromatic carbons appear at ca. 100-170 ppm and bridgehead carbons of triptycene, primary and quaternary carbons in bisphenol A appear at ca. 15-55 ppm and primary carbons on pyrazolium appear at ca. 0-10 ppm, according to one set of embodiments.
Figure 21A:
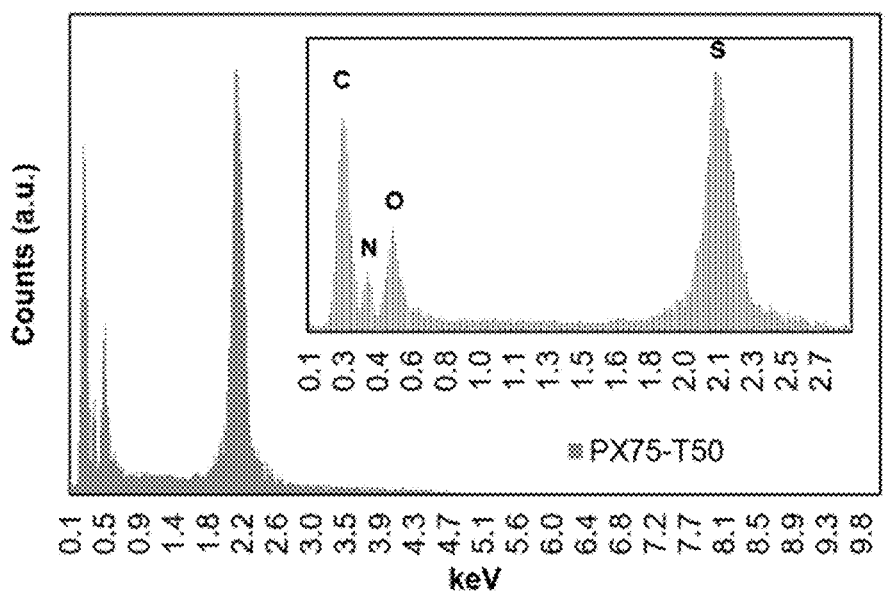
Figure 21B:
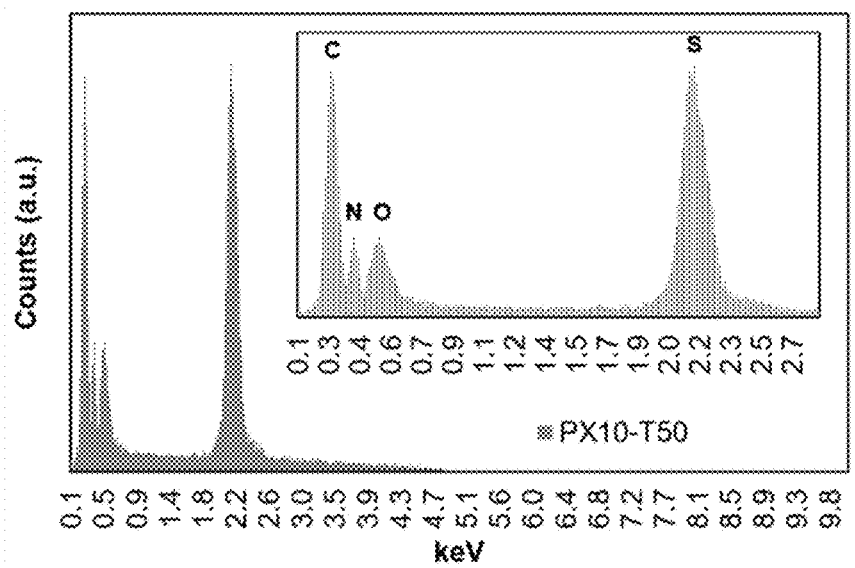

In some embodiments, membranes could be fabricated by in situ reactions of OH-PTES (x=50, 12) and pyrazolium dichloride (2) and monochloride (3) during film casting from a dimethylformamide/triethylamine solution. By simply changing the amount of each 2 and 3 added, three pyrazolium cross-linked poly(triptycene ether sulfone) membranes could be produced with different degrees of cross-linking, PX75-T50, PX40-T50, and PX10-T50, presented below in Table 1 (see also FIG. 20 for solid-state NMR spectra of membranes).

TABLE 1

A summary of monomers, 2 and 3, used for each degree of cross-linking

| Degree of cross-linking (%) | # of 2 (eq) | # of 3 (eq) | Total # of Cl⁻ leaving groups (eq) | Total # of pyrazoliums (eq) |
|---|---|---|---|---|
| 100 | 1.00 | 0.00 | 2.00 | 1.00 |
| 75 | 0.75 | 0.50 | 2.00 | 1.25 |
| 40 | 0.40 | 1.20 | 2.00 | 1.60 |
| 10 | 0.10 | 1.80 | 2.00 | 1.90 |
| 0 | 0.00 | 2.00 | 2.00 | 2.00 |

In some cases, the anion could be exchanged for another anion. For example, the substitution reaction between hydroxy on the polymer and chlorides of 2 and 3 was judged to be effectively quantitative, and the final membranes were subjected to ion exchange of $BF_4^-$ to $OH^-$. Polymers with x of equal to or greater than 63 were too brittle of free-standing membranes. Also, for x=50, 100% and 0% cross-linking did not result in free-standing membranes, shown above in Table 1 and below in Table 2.

TABLE 2

A summary of membrane-forming combinations of the degree of cross-linking and percent of triptycene.

|  | 100% | 75% | 40% | 10% | 0% |
|---|---|---|---|---|---|
| x = 75 | X | X | X | X | X |
| x = 63 | X | X | X | X | X |
| x = 50 | X | O | O | O | X |

Figure 19A:
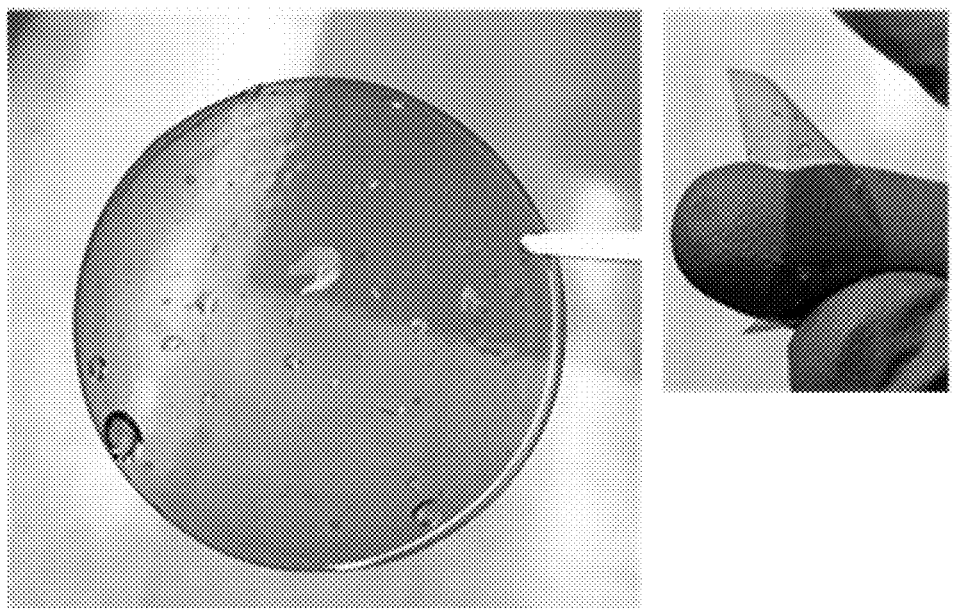
FIGS. 19A-19B show photographic images of the membranes PX75-T50 and PX10-T50 FIGS. 19A and 19B, respectively, where the samples were left in a water-filled petri dish overnight and then removed to be photographed immediately and were kept in their original shapes and forms, circular and strip, even after soaking in water overnight with a scale for the images shown in FIG. 19B, according to one set of embodiments.
Figure 19B:
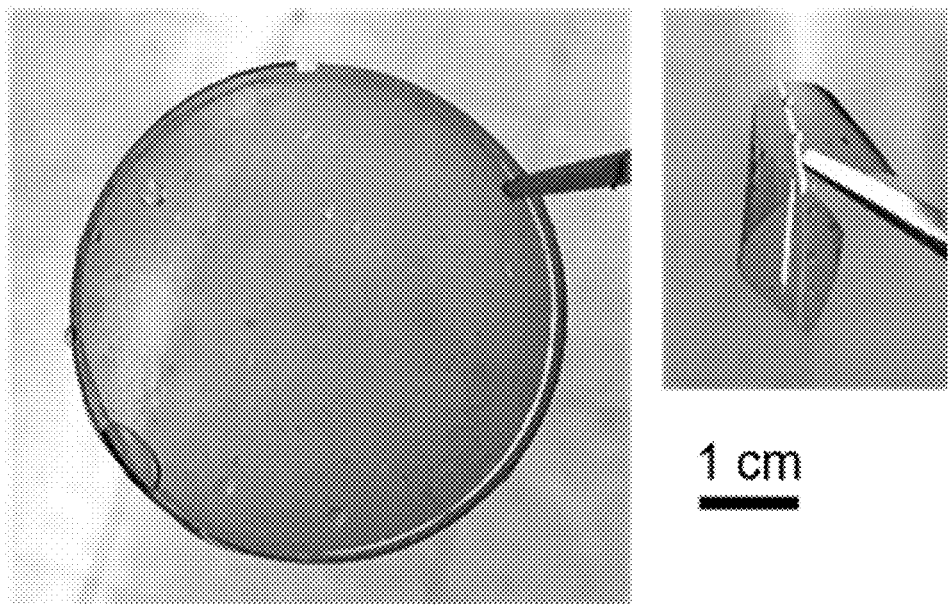
Figure 22:
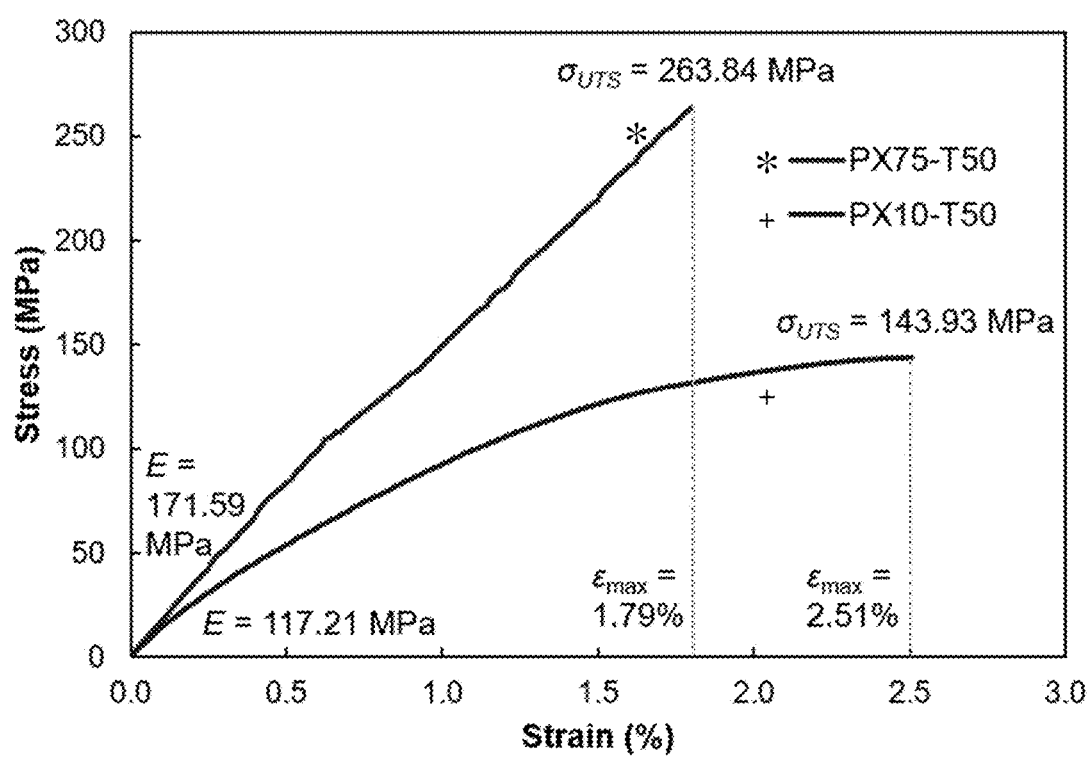
FIG. 22 shows stress-strain curves of the hydrated samples, where values of Young's modulus (E), ultimate tensile strength ($\sigma_{UTS}$), and maximum tensile strain ($\varepsilon_{max}$) of PX75-T50 and PX10-T50 are noted in the figure, according to some embodiments.

In these cases, within these restrictions, three membranes, PX75-T50, PX4-T50, and PX10-T50, were synthesized that showed a good balance of material properties (FIG. 1 and FIG. 3). Membranes prepared via slow drying in a vacuum oven have uniform thickness: 53±4, 55±3 and 64±5 μm (n3) for PX75-T50, PX4-T50, and PX10-T50, respectively (FIG. 19). The in situ preparation method has some advantages and allows simultaneous functionalization and cross-linking to tune the polymer's properties. The cross-linked free-standing membranes showed satisfactory mechanical properties (FIG. 22) with sufficiently high Young's moduli (171.59 and 117.21 MPa for PX75-T50 and PX10-T50, respectively) and ultimate tensile strengths (263.84 and 143.93 MPa for PX75-T50 and PX10-T50, respectively). Hence these materials were robust enough for fuel cell testing wherein they must be compressed without deformation at high torque bolts (5.5 N·m).

Improved Water Management Through Cross-Linking

Figure 3A:
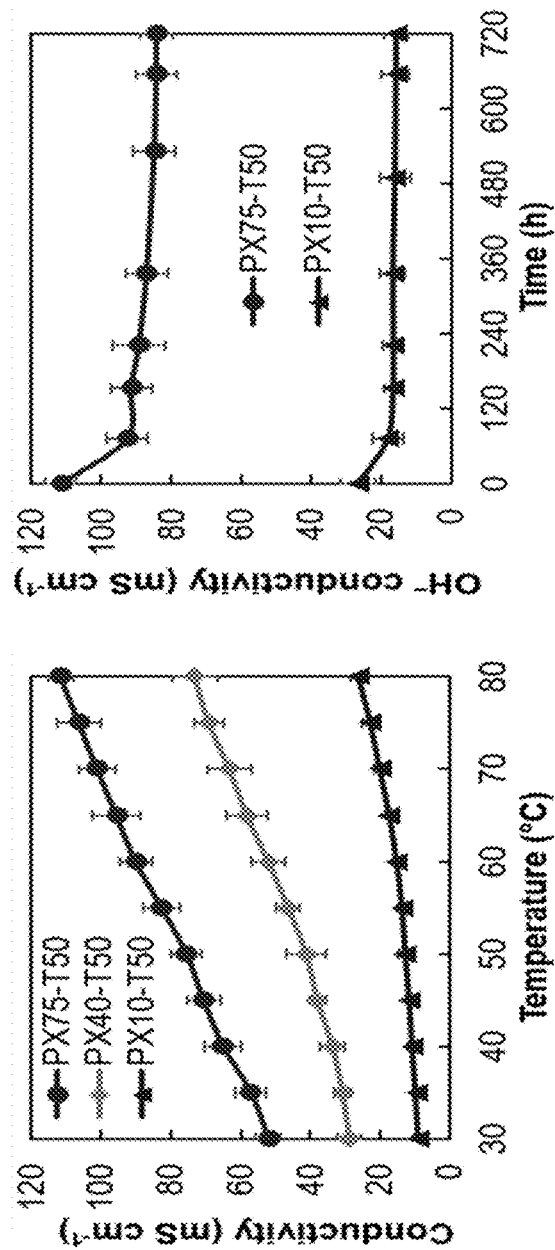
FIG. 3A shows hydroxide conductivity of pyrazolium cross-linked poly(triptycene ether sulfone) membranes showing the temperature-dependent conductivity of samples (n=3) and the OH$^-$ conductivity of PX75-T50 and PX10-T50 in 1 M KOH solution at 80° C. (n=3), according to one set of embodiments.

In some embodiments, hydroxide conductivity over a temperature range of 30-80° C., measured every 5° C. revealed that PX75-T50 achieved anion ionic conductivities of 95.7 and 101.2 mS cm$^{-1}$ at 65 and 70° C. (FIG. 3A). A conductivity of 100 mS cm$^{-1}$ at a working temperature of fuel cells (generally 60-80° C.) satisfies the standards of U.S. Department of Energy for reliable operation. PX75-T50 showed a conductivity of 52.1 mS cm$^{-1}$ at 30° C., and PX40-T50 and PX10-T50 showed progressively lower values 28.8 and 9.0 mS cm$^{-1}$ at the same temperature. At 80° C., PX75-T50, PX40-T50, and PX10-T50 showed conductivities of 111.6, 73.1, and 26.5 mS cm$^{-1}$, respectively. Activation energies ($E_a$) could be calculated from conductivity data using an Arrhenius equation (FIG. 23) show the highly cross-linked membrane, PX75-T50, to have lower Ea of 13.7 kJ mol$^{-1}$ that those of PX40-T50 and PX10-T50, which are respectively 17.6, and 18.9 kJ mol$^{-1}$. Low $E_a$ value for PX75-T50 were attributed to facilitated ion transport along cross-linked ionic highways.

Figure 3B:
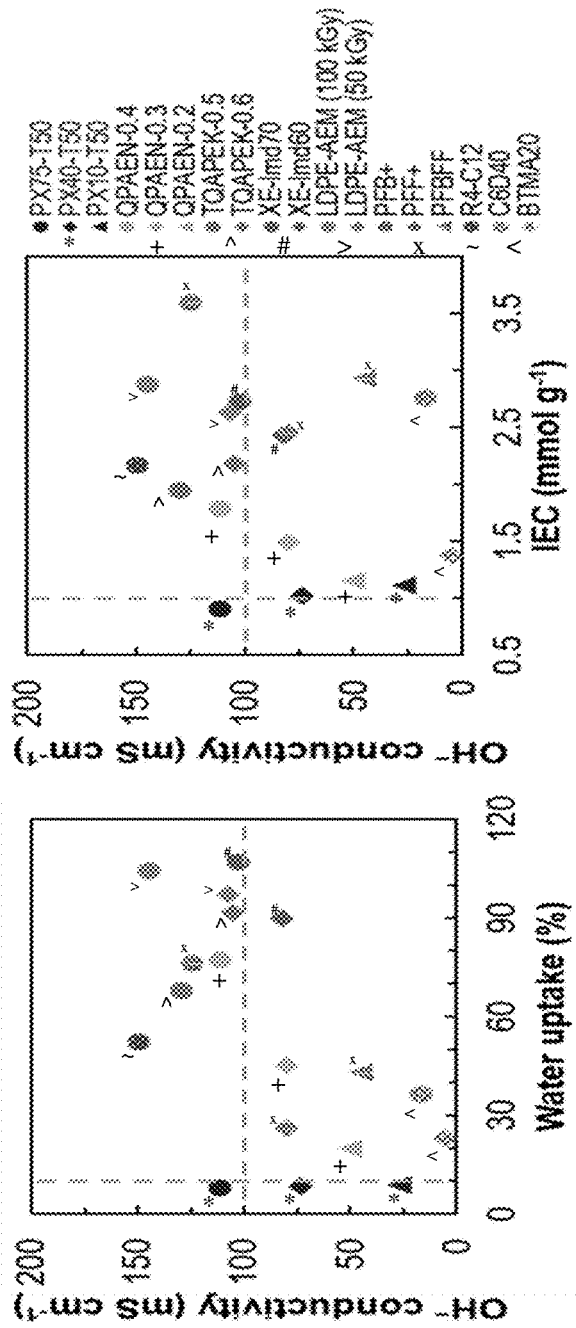
FIG. 3B shows is the hydroxide conductivity versus water uptake, where data points at 80° C. collected to be compared the hydroxide conductivity versus IEC with experimental data points at 20° C. collected to be compared, also including in the legend QPAEN, TQAPEK, XE-Imd, LDPE-AEM, PF, R4-C12, and C6D40 and BTMA20, according to one set of embodiments.

To probe the long-term alkaline stability membranes could be soaked in 1 M KOH solution at 80° C. and conductivity values were tracked for 720 h. PX75-T50 has an initial conductivity of 111.6 mS cm$^{-1}$ which decreased to 84.3 mS cm$^{-1}$ after 720 h, thereby retaining 76% of the initial performance (FIG. 3B). Without wishing to be bound by any theory, the initial decrease is likely due to hydroxide-induced degradation of residual pyrazolium chlorides or nucleophilic cleavage of crosslinks activated by stress on the polymer films. PX10-T50 retained 26.5 mS cm$^{-1}$, 61% of its initial value, after the same test conditions. PX75-T50 displayed a slow decrease of conductivity to be plateaued after 532 hours and stabilized at 84 mS cm$^{-1}$ after 30 days. NMR studies of the model cations (4 and 7) and membrane stability data support two operative degradation mechanisms: cleavage of the ether linkages and deprotonation of alpha protons of the pyrazolium 4-substituents, (FIG. 2, FIG. 3B, FIG. 15, and FIG. 16). It is recognized that C—N or C—C bonds may offer additional stability relative to the phenolic C—O bonds, and it has been shown in previous studies that suggest ether linkages potentially having limited alkaline stability (FIG. 15). It is important to note that the ether linkages in the polymer main chain are also a potential point of reactivity.

Highly cross-linked membranes can be mechanically resistive to water uptake (swelling). Accordingly, the membranes described herein may be configured to include water up to a certain amount (e.g., a wt % intake of water). In some embodiments, the water uptake of the membrane is no more than 30%, no more than 25%, no more than 20%, no more than 15%, no more than 10%, no more than 8%, no more than 6%, no more than 5%, no more than 4%, no more than 3%, no more than 2%, or no more than 1%. In some embodiments, the water uptake of the membrane is at least 1%, at least 2%, at least 3%, at least 4%, at least 5%, at least 6%, at least 8%, at least 10%, at least 15%, at least 20%, at least 25%, or at least 30%. Combinations of the above-referenced ranges are also possible (e.g., at least 1% and no more than 30%). Other ranges are possible. Water uptake can be determined by measuring the weight difference of the membrane before and after immersing in deionized water and is described in more detail below.

Figure 23:
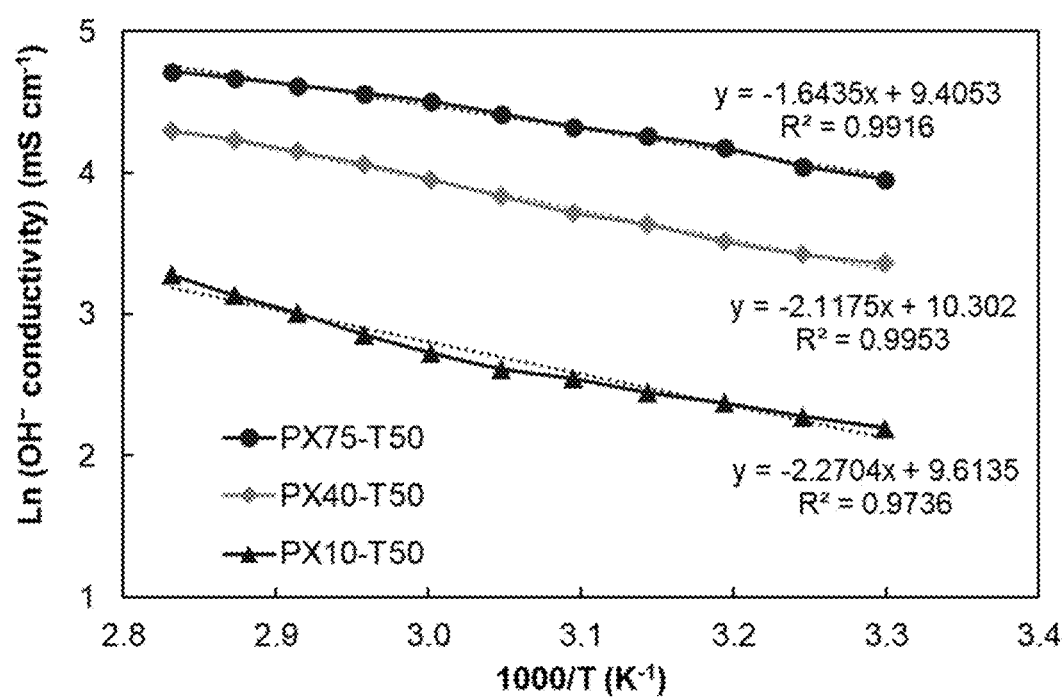
FIG. 23 shows the calculation of activation energy (E$_a$), where ln(OH$^-$ conductivity) vs. 1000/T plot of FIG. 3A, and the dotted lines indicate linear regression, and where calculated $E_a$ using the Arrhenius equation are 13.7, 17.6, and 18.9 kJ mol$^{-1}$ for PX75-T50, PX40-T50, and PX10-T50, respectively, according to some embodiments.
Figure 24A:
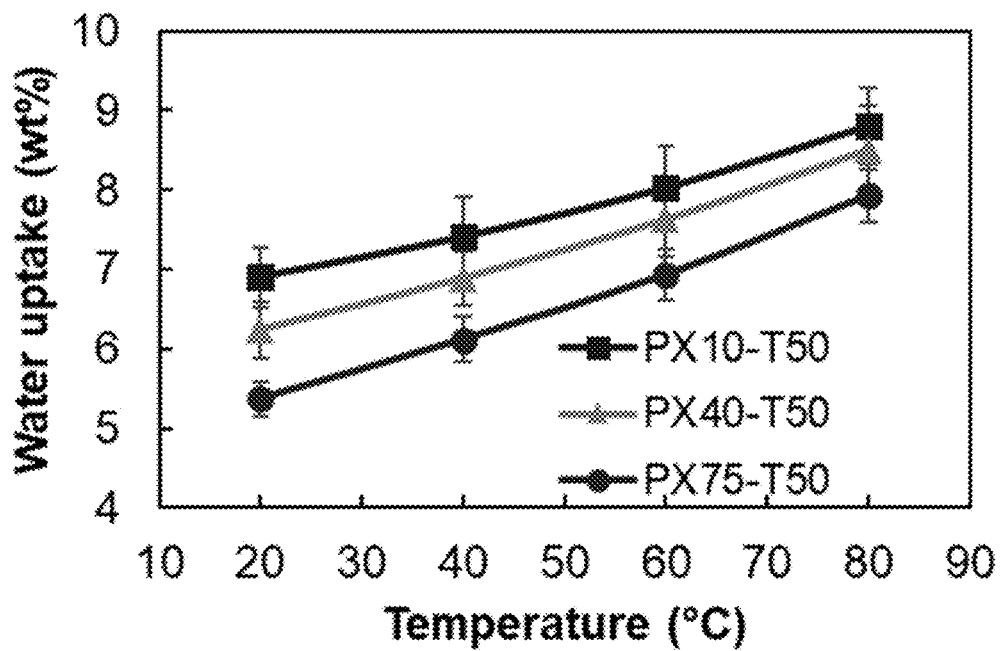
FIGS. 24A-24B show water uptake and in-plane swelling ratio data of membranes in the temperature ranges of 20 and 80° C. (n=3), according to one set of embodiments.
Figure 24B:
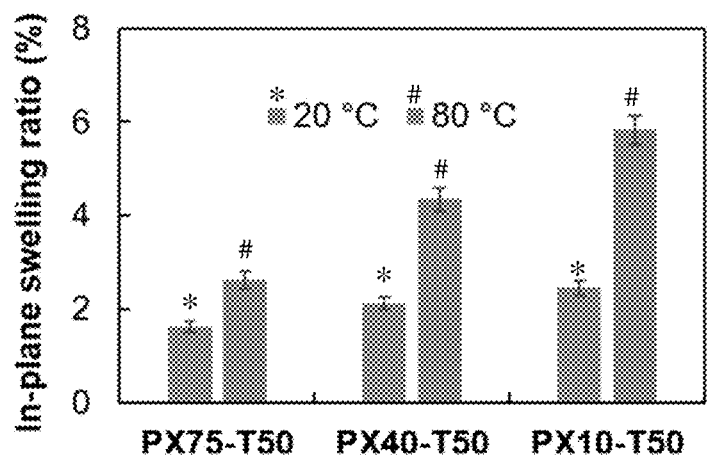

In some embodiments, the cross-linked membranes displayed low water uptakes of less than 10% (FIG. 3C and FIG. 23A) with values of 7.9, 8.5, and 8.8% at 80° C. observed for PX75-T50, PX40-T50, and PX10-T50, respectively. In some embodiments, the water uptake was inversely correlated to cross-linking degree and, in accord, swelling ratios of 2.6, 4.3, and 5.8% at 80° C. were observed for PX75-T50, PX40-T50, and PX10-T50, respectively (FIG. 24B). As can be seen from data (FIG. 3C), hydroxide conductivity generally increases with water uptake as a result of hydration of cationic centers. Previous reports of samples having higher conductivity over 100 mS cm$^{-1}$ and water uptake of greater than 50% are common. Without wishing to be bound by any theory, excessive water uptake membrane swelling leads to decreased fuel cell output through compromised contact with the two electrodes. Membranes that are highly conducting with minimal water-uptake and swelling were desired and finding systems that do not suffer from reduced conductance at low water uptake levels is uncommon. In this context, PX75-T50, which had reduced water uptake and the highest conductivity was an important advance. The effectiveness of some of the designs herein was also revealed by IEC analysis. Some of the cross-linked membranes have low IECs of 0.91, 1.03, and 1.12 mmol g$^{-1}$ for PX75-T50, PX40-T50, and PX10-T50, respectively, but maintain high conductivities (FIG. 3D and Table 3).

TABLE 3

Ion exchange capacity (IEC) values from theoretical calculation and experiments (n = 3).

|  | 75% | 40% | 10% |
| --- | --- | --- | --- |
| IEC$_{theoretical}$ | 0.91 | 1.05 | 1.16 |
| IEC$_{experimental}$ | 0.91 ± 0.03 | 1.03 ± 0.05 | 1.12 ± 0.04 |

In one set of embodiments, PX75-T50 had the remarkable property of having conductivity higher than 100 mS cm$^{-1}$ with an extremely low IEC of 0.91 mmol g$^{-1}$. Also within this series, it had the highest conductivity and lowest IEC, which supported the concept that the assembly of the cations in chains through a combination of crosslinking and grafting, created the facilitated transport referred to as an ionic highway.

Figure 25:
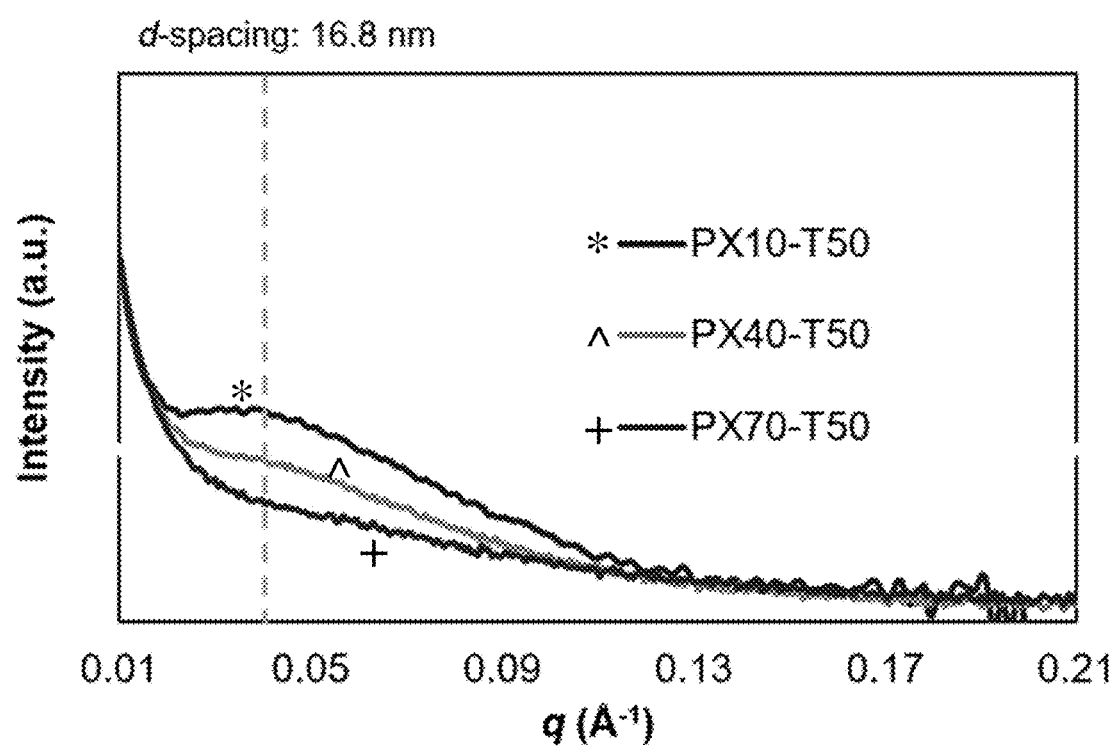
FIG. 25 shows small to medium angle X-ray scattering spectra of the samples where d-spacing values for PX10-T50 was calculated to be 16.8 nm, while samples with a higher degree of cross-linking, PX40-T50 and PX75-T50, showed monotonous features, according to some embodiments.
Figure 26:
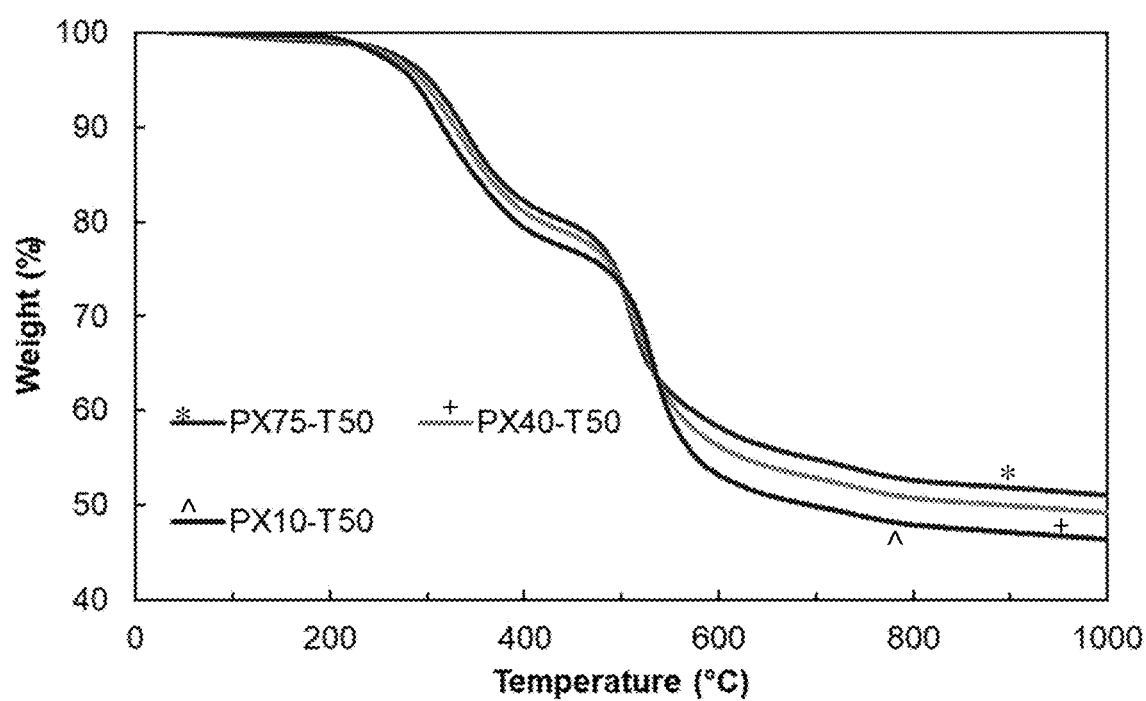
FIG. 26 shows a TGA analysis of the samples, where the samples were heated at 20° C./min from 30° C. to 1000° C., according to some embodiments.

These observations prompted the investigation of the internal sample morphology and structures of the three samples having a different degree of cross-linking. X-ray scattering experiments revealed that although the lightly cross-linked membrane, PX10-T50, had structures with d-spacing of 16.8 nm, the more highly cross-linked membranes, PX40-T50 and PX75-T50, display featureless scattering patterns (FIG. 25). The X-ray scattering data suggest that a high degree of cross-linking may remove some of the fractional free volume generated by the triptycene. Thermogravimetric analysis (FIG. 26) showed slightly higher char yields with heating to 1000° C. for PX75-T50 of 51% relative to PX40-T50 and PX10-T50 with 49 and 46% which is also consistent with a higher degree of cross-linking. Overall, achieving the highest conductivity with the lowest water uptake and IEC (FIG. 3) demonstrated that the formation of ionic highways was a promising approach for efficient hydroxide transport (FIG. 1, FIG. 3, and FIG. 23).

Computational Studies on Charge Delocalization and Ionic Highways

Figure 27A:
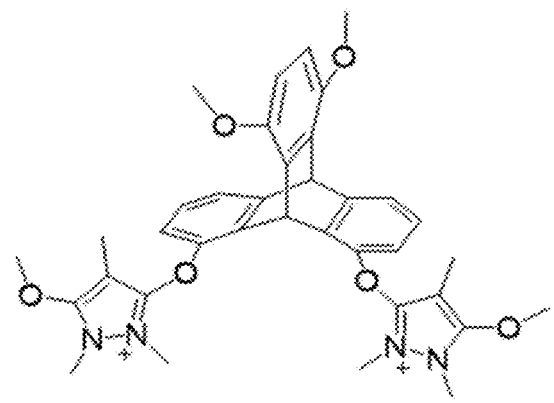
FIGS. 27A-27B show the chemical structures used for FIG. 4A in FIG. 27A and FIGS. 4B-4C in FIG. 27B, according to one set of embodiments.
Figure 27B:
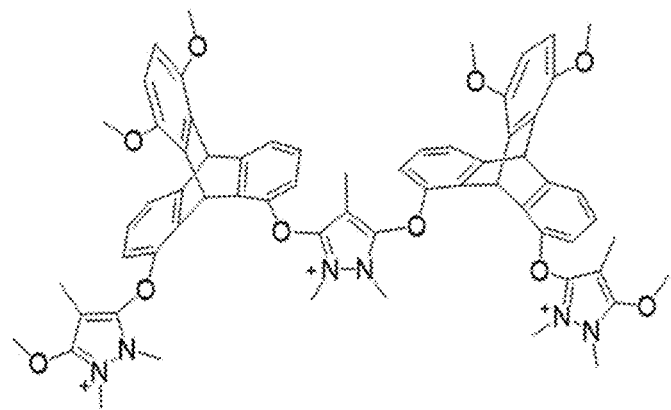
Figure 28:
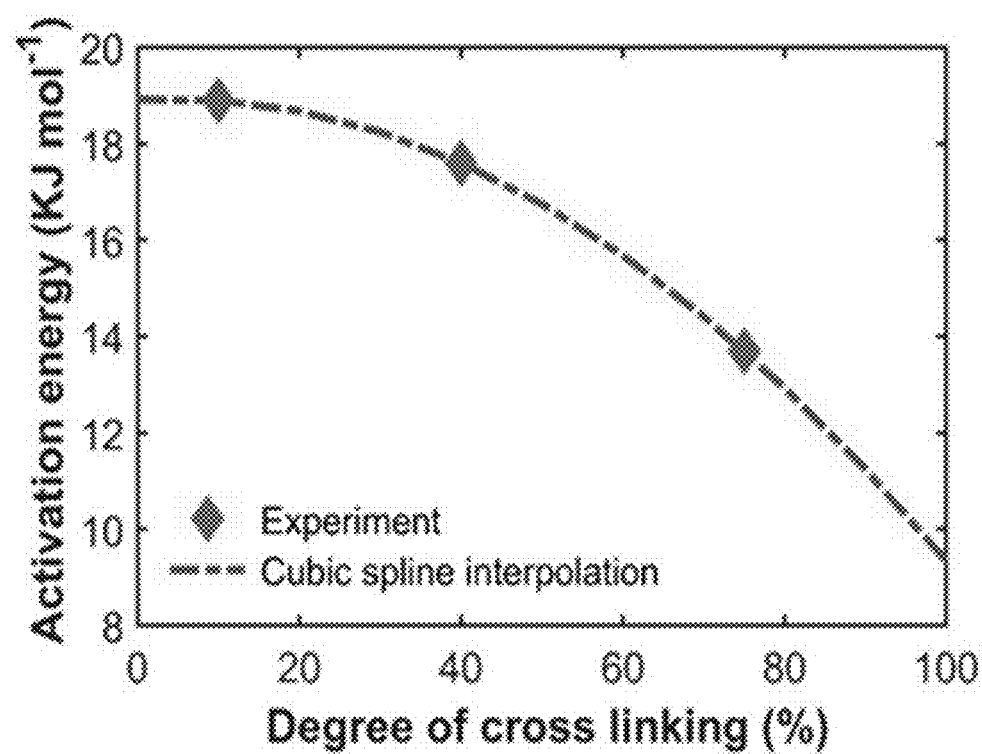
FIG. 28 shows the activation energy (estimated from experimental data) interpolated as a function of the degree of cross-linking, according to some embodiments.
Figure 29A:
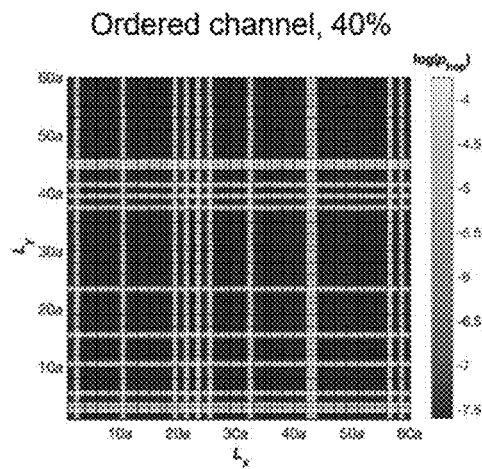
FIGS. 29A-29B show probability distribution maps of anion hopping in polymer networks where in cases for 40% and 10% degree of cross-linking for ordered channels, respectively, according to some embodiments.
Figure 29B:
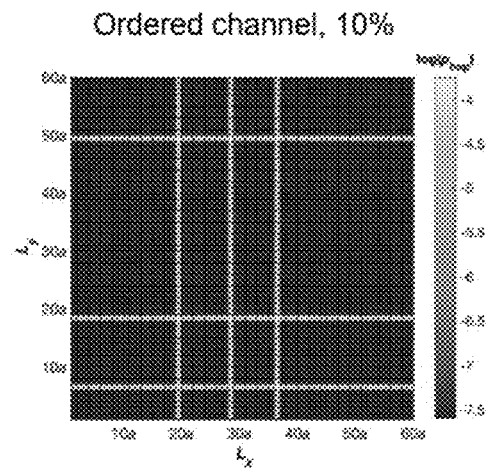
Figure 29C:
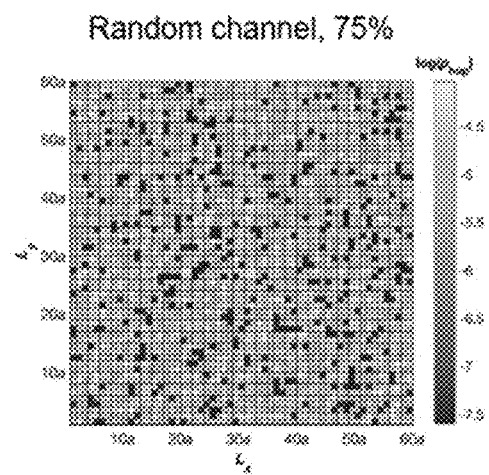
FIGS. 29C-29D show probability distribution maps of anion hopping in polymer networks in the cases for 75% and 40% degree of cross-linking for random channels, respectively, according to some embodiments.
Figure 29D:
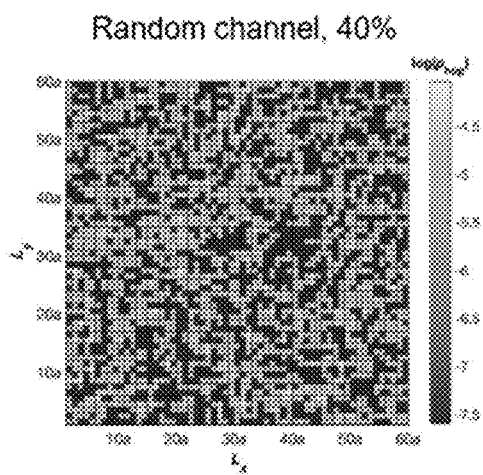
Figure 30:
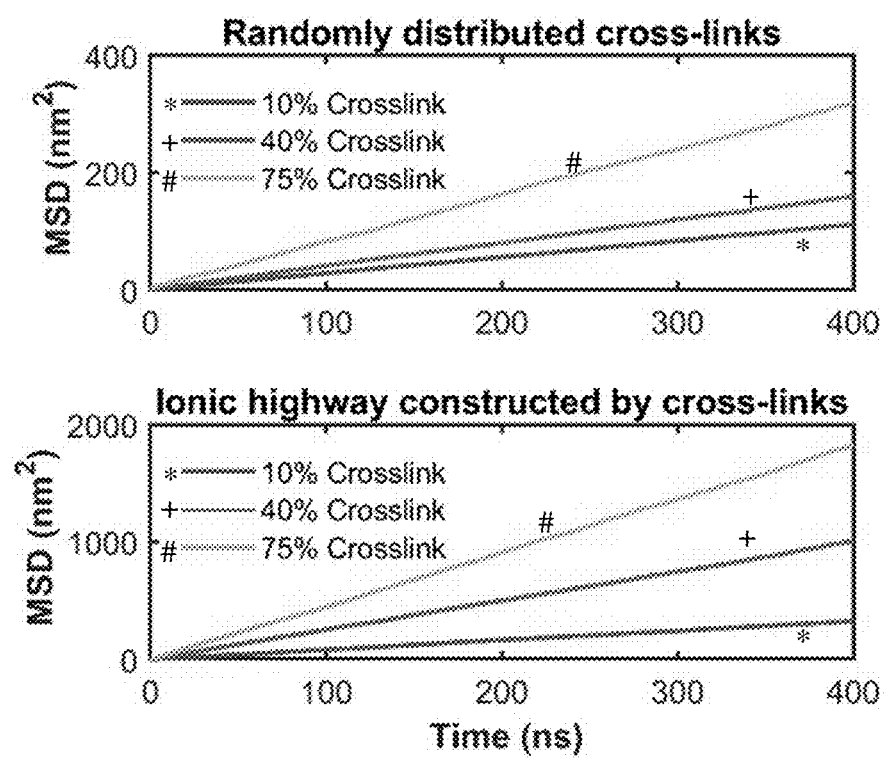
FIG. 30 shows mean-square displacements (MSD) of anions plotted as a function of time for simulations at 300K and different degree of cross-linking, with randomly distributed cross-links and aligned cross-links; according to some embodiments.
Figure 31A:
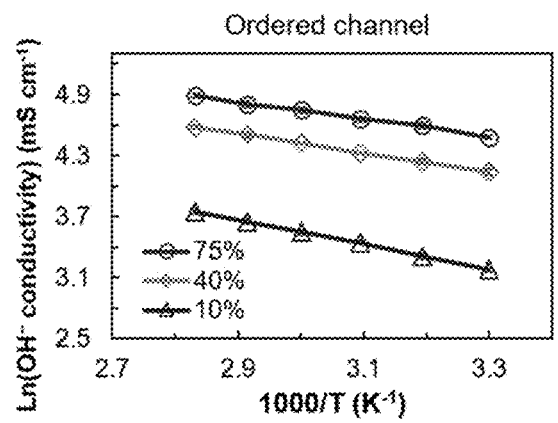
FIG. 31A shows plots of the natural logarithm of OH$^-$ conductivity of ordered channel model showing the random channel model, according to some embodiments.
Figure 31B:
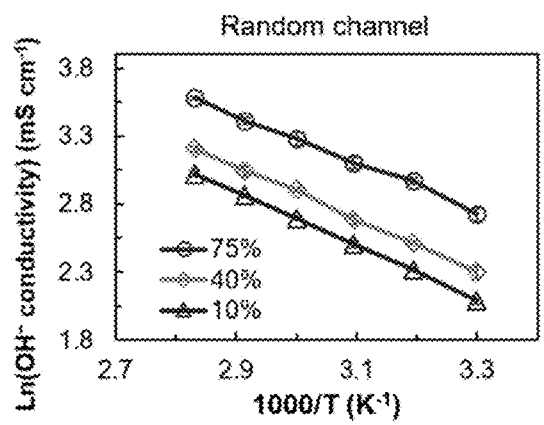
FIG. 31B shows plots of the natural logarithm of OH$^-$ conductivity of ordered channel model with the plot as a function of the inverse of temperature at different cross-linking degrees, respectively, according to some embodiments.

Motivated by these findings, the microscopic origin of charge transport in ionic highways was investigated using atomic scale simulations. Molecular models of pyrazolium cations cross-linked with triptycene units were used, which could be compared directly to non-cross-linked structures. An analysis of the electrostatic potential (ESP) of model geometries, which was derived from electronic structure calculations based on DFT, indicated that connecting pyrazolium (Pyr) to triptycene (Trp) led to a significant lowering of the maximum of the electrostatic potential, corresponding to a softening of the charge density (FIGS. 4A, 4B; FIG. 27 for model chemical structures). Compared to the corresponding non-cross-linked control systems, the doubly-(Pyr-Trp-Pyr) and triply-charged (Pyr-Trp-Pyr-Trp-Pyr) systems respectively showed a decrease of 0.2 and 0.5 eV of the ESP maximum. Assuming that a hydroxide can be reasonably well approximated as a point charge, this results in weaker hydroxide interactions with the cross-linked cations, which leads to a lowering of the activation energy for the hopping between adjacent cationic sites in our molecular models, and improved alkaline stability. Furthermore, the extensively delocalized lowest unoccupied molecular orbital (LUMO) of both doubly-charged and triply-charged cross-linked systems provided additional evidence of charge delocalization over the basal benzene wings of the triptycene units (FIG. 4B).

To further investigate the system, model systems of ionic networks were constructed using 2D Lattice Monte Carlo (2D-LMC) model, ionic conductivity in differently formed channels with varying degrees of cross-linking were simulated (FIGS. 4C-4H). Two systems were built where conducting channels were orderly and randomly aligned. In the two systems, degrees of cross-linking were changed to be 10, 40, and 75% (Table 1 was used for equivalence of monomers). Diffusivity and conductivity values were higher in the ordered systems (FIGS. 4D, 4E, 4F, and 4H). The conductivity from an ordered system with 10% cross-linking is higher than a random system with 75% cross-linking. This observation implied that construction of ionic highways is important for the significant improvements in the conductivity of the network. At a lower degree of cross-linking, the cross-links were scattered, making it challenging to form ion transport pathways (highways) throughout the entire polymer network. At the same time, a higher degree of cross-linking formed longer cross-linked path lengths, which should significantly boost the global diffusion of the anions. The conductivities predicted by the 2D-LMC model were in good agreement with the experimental measurements, capturing both the positive correlations between conductivity and cross-linking degree, and the Arrhenius dependence of conductivity on temperature (FIG. 4C, FIG. 4F and FIG. 28, FIG. 31). The fact that the ordered channel model gave a more accurate prediction for higher degree cross-linking, 75%; and the random channel model gave an accurate prediction for a lower degree of cross-linking, 10%, revealed the nature of the membranes at different degree of cross-linking.

Fuel Cell Performance

Figure 5A:
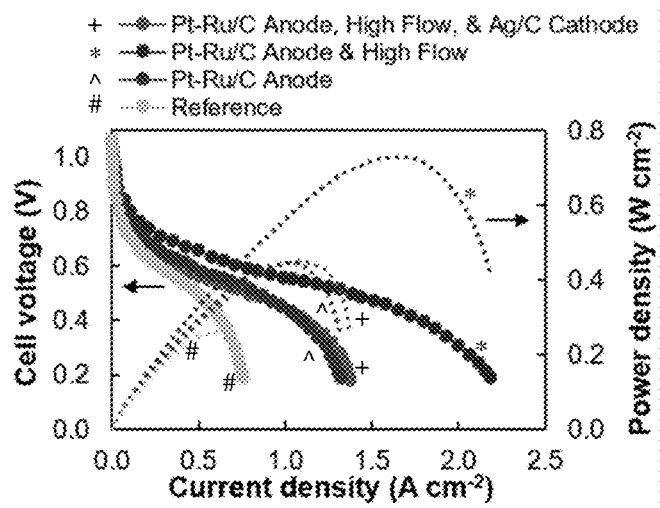
FIGS. 5A-5B shows H$_2$/O$_2$ AEMFC performance with PX75-T50 with FIG. 5A showing polarization curves with different catalysts and higher flow rates with data points with filled circles and dotted lines are for cell voltage and power density, respectively and FIG. 5B showing AEMFC durability test at a constant current density of 0.4 A cm$^{-2}$ at 80° C., with Pt—Ru/C anode, Pt/C cathode, and high gas flow, with reference condition means Pt/C for both electrodes, 0.2 L min$^{-1}$ for both gases, 80° C., 100% RH, and zero back pressure with the legend containing variables changed compared to the reference, and where high flow means 1.0 L min$^{-1}$ for both gases, and where the catalyst loading for all electrodes is 0.5 mg of metal (or bimetal) per unit cm$^2$, according to some embodiments.

In some embodiments, the membrane is used in a fuel cell. Membrane electrode assemblies using PX75-T50 demonstrated high power density and stability, generating typical polarization curves that included an activation region, an Ohmic region, and a mass transport region. AEMFC performance had progressively improved by changing catalyst for the anode and increasing gas flow rate. A reference condition (Pt/C, 0.5 mg$_{Pt}$cm$^{-2}$, for both electrodes, flow rate of 0.2 L min$^{-1}$ for both gases, 80° C., 100% RH, and zero back pressure) enabled a peak power density of 0.26 W cm$^{-2}$ at 0.59 A cm$^{-2}$ (FIG. 5A), which was comparable to benchmark systems at the same working conditions. Changing the anode catalyst to Pt—Ru/C (0.5 mg$_{Pt}$ cm$^{-2}$ and 0.25 mg$_{Ru}$ cm$^{-2}$) increased the peak power density to 0.45 W cm$^{-2}$. Increasing gas flow rate to 1.0 L min$^{-1}$ for both gases, while keeping Pt—Ru/C for the anode, further increased the peak power density to 0.73 W cm$^{-2}$. More active catalysts reduced activation barriers for the hydrogen oxidation reaction, and faster gas transport gave higher rates (power). The fuel cells with PX75-T50 gave high performance with more economical silver catalysts. Ag/C, 0.5 mgAu cm$^{-2}$, on cathode resulted in 0.47 W cm$^{-2}$ peak power density, with Pt—Ru/C for the anode and the high flow rate. Although a greater voltage drop was observed from the polarization curve with Ag/C cathode, this was a promising result considering substantial power output and significantly lower price of silver (the price of Ag is 2% of that of Pt).

Figure 5B:
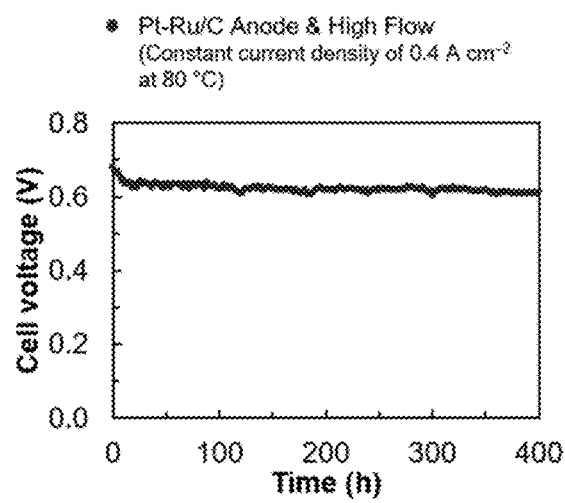
Figure 6:
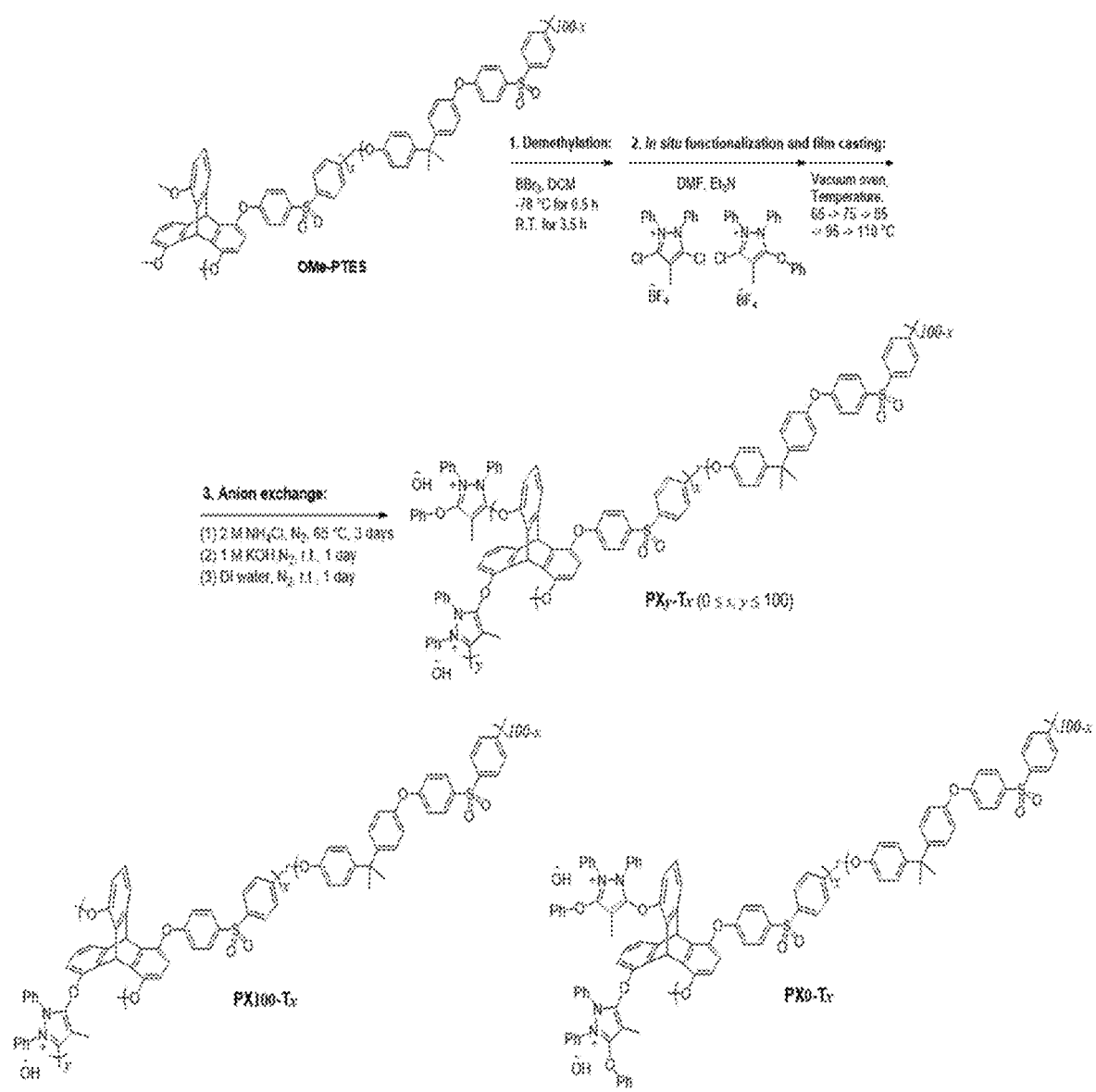
FIG. 6 is a schematic illustration of ionic highways for anion exchange membranes, according to some embodiments.

To test single cell durability, a constant current discharge of 0.40 A cm$^{-2}$ was applied at 80° C., up to 400 h under the conditions used for "Pt—Ru/C Anode & High Flow". Although there was some initial loss, only a 10% voltage decrease was observed (FIG. 5B) over this entire test. This reliable long-term cell operation was consistent with the membrane stability data (FIG. 3B), and the mechanical stability of the membrane. PX75-T50 displayed only 8% water uptake and 3% swelling ratio at 80° C. This improved mechanical stability, as compared to existing systems, and resulted in reliable long-term operation by maintaining conformal contact between the membrane and the electrode assembly.

While membranes can be used in fuel cells, other applications are possible. In some embodiments, the membrane is used in an electrochemical cell. Electrochemical cells are known and those skilled in the art in view of the teachings of the present disclosure are capable of forming an electrochemical cell with the inventive membranes described herein.

Conclusion and Outlook

A new generation of AEMs from pyrazolium cross-linked triptycene copolymers were synthesized wherein charges were delocalized to construct ionic highways for lower conduction barriers and increased chemical/mechanical stability. The membranes achieved enhanced properties with decreased water uptake and lower TEC, features that diverge from present trends among AEMs. These uncommon features were the result of ionic highway networks that were formed from the unique crosslinked structures in the membranes. Computational studies on ESP and 2D-LMC helped reveal how extended networks of pyrazolium and triptycene produce ionic highways by lowering diffusion barriers. The peak power density of 0.73 W cm$^{-2}$ from platinum-group-metal electrodes, 0.47 W cm$^{-2}$ from the silver-based cathode, and stable long-term cell operation made the materials further qualify this approach as promising. The concept of assembling an ionic highway using charge delocalized cations as cross-linkers established a promising direction to the develop new generations of high performing AEMs for cleaner energy generation.

The following examples are intended to illustrate certain embodiments of the present invention, but do not exemplify the full scope of the invention.

EXAMPLE 1

The following example describes general characterization methods (NMR, TGA, tensile strength) used according to some embodiments described herein.

Chemicals including diethyl 2-methylmalonate, diethyl 2-butylmalonate, hydrazobenzene, sodium ethoxide solution 21 wt. % in ethanol, hydrochloric acid, phosphorus oxychloride, sodium tetrafluoroborate, trimethylamine, phenol, 1,8-dihydroxy-9,10-anthraquinone, dimethyl sulfate, potassium carbonate, benzoquinone, and boron tribromide solution 1.0 M in methylene chloride were purchased from Sigma-Aldrich unless otherwise noted, and used as received. Hygroscopic monomers and base salts were dried in 60° C. vacuum oven overnight before use. Toluene, acetonitrile, dimethylacetamide, dimethylformamide, and xylene, were dried over 3 Å molecular sieves for at least 24 h.

$^1$H and $^{13}$C NMR spectra were obtained using a Bruker 400 and 500 MHz. $^{13}$C magic-angle spinning spectra were obtained using a Varian Inova 500. Molecular weights of polymers were obtained with the soluble fraction in THF using gel permeation chromatography with polystyrene as a standard. Thermogravimetric analysis was performed using TA Discovery TGA from 25° C. to 1000° C. at a heating rate of 20° C./min. Tensile test was performed on Zwick/Roell Z010 with a 10 kN load cell with a tensile rate of 1 mm/s. For all experiments, mean values from triplicate experiments are used unless otherwise noted.

EXAMPLE 2

The following example described the determination of anion conductivity, according to some embodiments.

Anion conductivity at various temperature was obtained through electrochemical impedance spectroscopy using electrochemical interface (Solartron 1287) with an impedance analyzer (Solartron 1260). Films were placed across two platinum electrodes spaced 3 cm apart, and the setup is placed in a water bath placed in an oven. Measurements were taken over the temperature range of 20-80° C. with a mean AC voltage 0 V and an amplitude of 0.1 V over a frequency range of 10 MHz to 0.1 Hz. Hydroxide conductivity, σ, was then calculated using Eq. S1 where l is the length between the electrodes, R is the resistance of the membrane acquired from a Nyquist plot, t is the thickness of the membrane, and w is the width of the membrane. The membranes were equilibrated in N$_2$ gas purged deionized water for at least 24 h at room temperature before measurements.

$$\sigma = \frac{l}{R * t * w} \quad \text{(Eq. S1)}$$

For determining the alkaline stability of the membranes, the above conditions of Example 2 were used. The membranes were immersed in an aqueous 1 M KOH solution at 80° C. up to 720 h. Before measuring the conductivity, the membranes were thoroughly washed with N$_2$-bubbled DI water (i.e., sparged) and soaked in N$_2$-bubbled DI water overnight.

EXAMPLE 3

The following example describes the determination of the ion exchange capacity (IEC), according to some embodiments.

IEC was determined by a back titration method with 0.01 M sodium hydroxide solution to prevent errors that can occur from the reaction of free hydroxide with carbon dioxide in the air. The membranes were first soaked in 2.0 M sodium hydroxide solution for 24 hours, rinsed with deionized water and soak in deionized water for another 24 hours to ensure that all the mobile ions in the membrane are hydroxide. The membranes were then transferred into 20 ml (V$_{HCl}$) of 0.10 M hydrochloric acid (M$_{HCl}$) for exchange the hydroxide with chloride ions. The acid was then titrated with 0.01 M ($M_{NaOH}$) sodium hydroxide solution (standardized with 0.010 M potassium hydrogen phthalate) until pH 7.0 using a pH meter and the volume of base ($V_{NaOH}$) was used to calculate amount of acid that was neutralized by the hydroxide ($n_{OH^-}$) in the membrane which was then used to determine IEC with Eq. S2, where $W_{dry}$, is the weight of the dried membrane.

$$IEC = \frac{n_{OH^-}}{W_{dry}} = \frac{V_{HCl} * M_{HCl} - V_{NaOH} * M_{NaOH}}{W_{dry}} \quad \text{(Eq. S2)}$$

EXAMPLE 4

The following example described the determination of x-ray scattering for a membrane, according to some embodiments.

Transmission small-, medium- and wide-angle X-ray scattering measurements were performed on SAXSLAB instrument. Hydrated membranes were sandwiched by Kapton tapes and mounted on the stage. The instrument was equipped with a Rigaku 002 microfocus X-ray source with an Osmic staggered parabolic multilayer optics to focus the beam and two sets of JJ X-ray 4 jaw single crystal collimation slits (aperture sizes of two slits are 0.7, 0.3 mm). Samples were introduced into a large vacuum chamber that was pumped down to 0.08 mbar. The transmitted X-rays were detected with a DECTRIS PILATUS 300K. The internal domain spacing (the Bragg spacing), d, was calculated using Eq. S3:

$$d = \frac{2\pi}{q} \quad \text{(Eq. S3)}$$

EXAMPLE 5

The following example describes the determination of the water uptake for a membrane, according to some embodiments.

Water uptake was determined by measuring the weight difference of the membrane before and after immersing in deionized water. The samples were placed in deionized water at desired temperatures for more than four hours, dried with a Kimwipe to remove surface water and immediately weighed to determine the weight of the wet membrane. Then the wet membranes were subsequently dried at 60° C. under vacuum for 20 h and weighed to obtain the weight of dried samples. The weights of the hydrated, $W_{wet}$, and dry, $W_{dry}$, membrane were then used to calculate water uptake using Eq. S4.

$$\text{Water uptake (\%)} = \frac{W_{wet} - W_{dry}}{W_{dry}} \times 100 \quad \text{(Eq. S4)}$$

EXAMPLE 6

The following describes the determination of the swelling ratio, according to some embodiments.

All lengths and widths were measured with a Vernier caliper and thicknesses were measured with a micrometer screw gauge to improve the precision of the measurements. Samples were placed in deionized water at desired temperatures for more than 4 h, dried with a Kimwipe to remove surface water and immediately measured to determine the dimensions of the wet membrane. The wet membranes were subsequently dried at 60° C. under vacuum overnight before dimensions of dried samples were measured. The surface area of the hydrated, $A_{wet}$, and dry, $A_{dry}$, membranes were then used to calculate water in-plane swelling ratio using Eq. S5.

$$\text{In Plane Swelling Ratio (\%)} = \frac{A_{wet} - A_{dry}}{A_{dry}} \times 100 \quad \text{(Eq. S5)}$$

EXAMPLE 7

The following describes the preparation of a fuel cell and its testing, according to some embodiments.

Catalyst inks were prepared by mixing carbon-supported Pt (60 wt. % Pt on high surface area carbon, HiSPEC 9100, Fuel Cell Store) or carbon-supported Pt—Ru alloy (50 wt. % Pt, 25 wt. % Ru on high surface area carbon, HiSPEC 12100, Fuel Cell Store) and poly (vinylbenzyl chloride) with ethyl acetate solvent. The catalyst to ionomer ratio in the dispersion is 30%. The mixture was sonicated for 30 min, to be carefully sprayed onto the microporous layer coating of gas diffusion layer (GDL) to achieve a Pt loading of 0.50 mg $cm^{-2}$. The catalyst coated carbon paper was soaked in undiluted N,N,N',N'-tetramethyl-1,6-hexanediamine (99%, Sigma-Aldrich) overnight. The GDL was immersed in 0.5 M NaOH at 80° C. for 1 h and rinsed carefully with deionized water to convert to hydroxide form. The prepared membrane was sandwiched in between two gaskets (Teflon films) and sealed into the test cell (area: 5 $cm^2$, serpentine flow field, Scribner Associates Inc) at a torque of 5.5 N·m, using retaining bolts and a torque driver.

A Fuel Cells software (Scribner Associates Inc) was used to record the polarization curves of the fuel cell. For all MEAs, measurement and cell break-in were performed under $H_2/O_2$ conditions without backpressure. Before polarization curve measurement, the assembled cells were activated at open circuit voltage (OCV) for one hour, followed by potentiostatic control at 0.1 V and then 0.5 V for 30 min each (or until a stable constant current was obtained).

EXAMPLE 8

The following example describes the synthesis of several compounds and/or polymers, according to some embodiments.

4-methyl-1,2-diphenylpyrazolidine-3,5-dione (1). 30.053 mL of Sodium ethoxide solution 21 wt. % in ethanol (80.5 mmol of sodium ethoxide) was added to a 100 mL schlenk flask charged with $N_2$, followed by 20 mL of additional absolute EtOH. Diethyl 2-methylmalonate (11.931 g, 70.0 mmol) was added and stirred until it is fully dissolved at room temperature, followed by hydrazobenzene (12.897 g, 70.0 mmol). The mixture was refluxed while being stirred for 24 h. The solvent was removed under reduced pressure. Then 20 mL water was added, followed by 20 mL of diethyl ether. A slight precipitate may be observed and should be filtered off. The layers are separated and the aqueous layer washed with 2×30 mL ether. The dione was precipitated from the aqueous layer as a light yellow solid by addition of 60 mL of 2N HCl and collected via filtration. The solid was washed with water (3×50 mL). Drying afforded 13.784 g (74% yield) of a light yellow solid. $^1$H NMR (CDCl$_3$, 400 MHz): δ 1.60-1.62 (d, 3H), 3.38-3.44 (q, 1H), 7.16-7.22 (m, 2H), 7.31-7.33 (m, 8H) ppm; $^{13}$C NMR (CDCl$_3$, 100 MHz): δ 12.20, 41.26, 122.53, 126.84, 128.99, 135.76, 170.70 ppm; HRMS (DART): m/z calculated for $C_{16}H_{15}O_2N_2^+$ (M+H$^+$) 267.1134, found 267.1148.

4-methyl-3,5-dichloro-1,2-diphenyl-pyrazolium tetrafluoroborate (2). To a 22 mL toluene, the dione (13.513 g, 50.8 mmol) and phosphorus oxychloride (18.932 mL, 203.1 mmol) was added to be refluxed for 4 hours. The mixture was cooled to room temperature and excess H$_2$O (caution! HCl may be produced) was slowly added. After separating the layers, an aqueous solution of sodium tetrafluoroborate (11.150 g, 101.6 mmol) was added to the aqueous fraction, and the resulting solid was isolated via filtration and washed with DI water (3×50 mL) and diethyl ether (3×50 mL). Drying afforded 19.212 g (97% yield) of a colorless solid. $^1$H NMR (CDCl$_3$, 400 MHz): δ 2.39 (s, 3H), 7.41-7.58 (m, 10H) ppm; $^{13}$C NMR (CDCl$_3$, 100 MHz): δ 8.51, 129.55, 130.33, 130.76, 132.87 ppm; HRMS (DART): m/z calculated for $C_{16}H_{13}N_2Cl_2^+$ (M$^+$) 303.0456, found 303.0476.

4-methyl-3-chloro-5-phenoxy-1,2-diphenyl-pyrazolium tetrafluoroborate (3). To a 2.5 mL acetonitrile, 2 (0.200 g, 0.51 mmol), phenol (0.048 g, 0.51 mmol) were added. After dissolution, an ice bath was set up, to which trimethylamine (0.214 mL, 1.54 mmol) was added. After stirring overnight, diethyl ether (10 mL) was added to precipitate the product and ammonium salts. The resulting solid was isolated via filtration and washed with DI water (3×20 mL) and diethyl ether (3×20 mL). Recrystallization from ethanol afforded 0.172 g (75% yield) of a colorless solid. $^1$H NMR (DMSO*, 500 MHz): δ 1.86 (s, 3H), 7.32-7.74 (m, 15H) ppm; $^{13}$C NMR (CDCl$_3$, 100 MHz): δ 7.70, 118.73, 126.49, 129.14, 129.58, 129.93, 130.04, 130.51, 132.04, 132.18 ppm; HRMS (DART): m/z calculated for $C_{22}H_{18}O_1N_2Cl_1^+$ (M$^+$) 361.1108, found 361.1127. *DMSO-d$_6$ was used to avoid the overlap of NMR solvent peak with the aryl peaks.

4-methyl-3,5-diphenoxy-1,2-diphenyl-pyrazolium tetrafluoroborate (4). To a 2.5 mL acetonitrile, 2 (0.200 g, 0.51 mmol), phenol (0.120 g, 1.28 mmol) were added. After dissolution, an ice bath was set up, to which trimethylamine (0.286 mL, 2.05 mmol) was added. After stirring overnight, diethyl ether (10 mL) was added to precipitate the product and ammonium salts. The resulting solid was isolated via filtration and washed with DI water (3×20 mL) and diethyl ether (3×20 mL). Drying afforded 0.225 g (87% yield) of a colorless solid. $^1$H NMR (CDCl$_3$, 400 MHz): δ 1.36 (s, 3H), 7.17-7.21 (m, 2H), 7.37-7.43 (m, 14H), 7.59-7.62 (q, 4H) ppm; $^{13}$C NMR (CDCl$_3$, 100 MHz): δ 6.78, 118.48, 126.22, 129.37, 129.73, 130.02, 130.65, 131.72, 153.84, 154.15 ppm; HRMS (DART): m/z calculated for $C_{22}H_{18}O_1N_2C_1^+$ (M$^+$) 361.1108, found 361.1137.

4-butyl-1,2-diphenylpyrazolidine-3,5-dione (5). 30.053 mL of Sodium ethoxide solution 21 wt. % in ethanol (80.5 mmol of sodium ethoxide) was added to a 100 mL schlenk flask charged with N$_2$, followed by 20 mL of additional absolute EtOH. Diethyl 2-butylmalonate (15.401 g, 70.0 mmol) was added and stirred until it is fully dissolved at room temperature, followed by hydrazobenzene (12.897 g, 70.0 mmol). The mixture was refluxed while being stirred for 24 h. The solvent was removed under reduced pressure. Then 20 mL water was added, followed by 20 mL of diethyl ether. A slight precipitate may be observed and should be filtered off. The layers were separated and the aqueous layer washed with 2×30 mL ether. The dione was precipitated from the aqueous layer as a light yellow solid by addition of 60 mL of 2N HCl and collected via filtration. The solid was washed with water (3×50 mL). Drying afforded 16.178 g (75% yield) of a light yellow solid. $^1$H NMR (CDCl$_3$, 400 MHz): δ 0.89-0.93 (t, 3H), 1.33-1.42 (sextet, 2H), 1.46-1.54 (quintet, 2H), 2.07-2.12 (t, 2H), 7.16-7.21 (sextet, 2H), 7.31-7.34 (m, 8H) ppm; $^{13}$C NMR (CDCl$_3$, 100 MHz): δ 13.71, 22.49, 27.92, 27.94, 46.25, 122.54, 126.81, 128.98, 135.78, 170.39 ppm; HRMS (DART): m/z calculated for $C_{19}H_{21}O_2N_2^+$ (M+H$^+$) 309.1603, found 309.1619.

4-butyl-3,5-dichloro-1,2-diphenyl-pyrazolium tetrafluoroborate (6). To a 22 mL toluene, the dione (13.513 g, 50.8 mmol) and phosphorus oxychloride (18.932 mL, 203.1 mmol) were added to be refluxed for four hours. The mixture was cooled to room temperature and excess H$_2$O (caution! HCl may be produced) was slowly added. After separating the layers, an aqueous solution of sodium tetrafluoroborate (11.150 g, 101.6 mmol) was added to the aqueous fraction and the resulting solid was isolated via filtration and washed with DI water (3×50 mL) and diethyl ether (3×50 mL). Drying afforded 21.755 g (99% yield) of a colorless solid. $^1$H NMR (CDCl$_3$, 400 MHz): δ 0.99-1.03 (t, 3H), 1.44-1.54 (sextet, 2H), 1.71-1.79 (quintet, 2H), 2.78-2.82 (t, 2H), 7.42-7.51 (m, 6H), 7.58-7.60 (d, 4H) ppm; $^{13}$C NMR (CDCl$_3$, 100 MHz): δ 13.83, 22.67, 23.35, 29.88, 121.59, 129.55, 130.35, 132.87 ppm; HRMS (DART): m/z calculated for $C_{19}H_9N_2Cl_2$+(M+) 345.0925, found 345.0924.

4-butyl-3,5-diphenoxy-1,2-diphenyl-pyrazolium tetrafluoroborate (7).

To a 2.5 mL acetonitrile, 6 (0.221 g, 0.51 mmol), phenol (0.120 g, 1.28 mmol) were added. After dissolution, an ice bath was set up, to which trimethylamine (0.286 mL, 2.05 mmol) was added. After stirring overnight, diethyl ether (10 mL) was added to precipitate the product and ammonium salts. The resulting solid was isolated via filtration and washed with DI water (3×20 mL) and diethyl ether (3×20 mL). Drying afforded 0.236 g (84% yield) of a colorless solid. $^1$H NMR (CDCl$_3$, 400 MHz): δ 1.36 (s, 3H), 7.17-7.21 (m, 2H), 7.37-7.43 (m, 14H), 7.59-7.62 (q, 4H) ppm; $^{13}$C NMR (CDCl$_3$, 100 MHz): δ 13.40, 20.78, 22.30, 30.40, 118.11, 126.12, 129.40, 129.63, 130.02, 130.68, 131.78, 154.43 ppm; HRMS (DART): m/z calculated for $C_{31}H_{29}O_2N_2^+$ (M$^+$) 461.2229, found 461.2233.

1,8-dimethoxyanthracene-9,10-dione (8). 1,8-dihydroxy-9,10-anthraquinone (15.61 g, 65.0 mmol) and K$_2$CO$_3$ (22.46 g, 162.5 mmol) were added into a solution of anhydrous acetone (250 mL) charged with N$_2$. The mixture was refluxed while being stirred. After it started to reflux, first 50% portion of dimethyl sulfate (7.70 mL, 81.25 mmol) was added dropwise. After 6 hr, the other 50% of dimethyl sulfate (7.70 mL, 81.25 mmol) was added dropwise. After 2 days, the mixture was cooled down to r.t. (i.e., room temperature). Moreover, the solvent was removed under reduced pressure. To the solid resultant, water was added, and products were extracted with dichloromethane until the extracts are only slightly yellow. Some dark red solids in the extracts were removed by vacuum filtration through a glass frit. The organic layer was washed with 2M NaOH (until the product becomes light red; often more than five times) and 2M HCl (once). The solution was dried with a mixture of Na$_2$CO$_3$ and K$_2$CO$_3$, to be filtered and dried under reduced pressure to give a 14.81 g of yellow solid (85% yield). $^1$H NMR (CDCl$_3$, 400 MHz): δ 4.01 (s, 6H), 7.29-7.31 (d, 2H), 7.62-7.66 (t, 3H), 7.82-7.85 (d, 2H) ppm; $^{13}$C NMR (CDCl$_3$, 100 MHz): δ 56.68, 118.18, 119.05, 124.14, 134.07, 134.88, 159.57, 180.12, 184.23 ppm; HRMS (DART): m/z calculated for $C_{16}H_{13}O_4^+$ (M+H$^+$) 269.0756, found 269.0763.

1,8-dimethoxyanthracene (9). 8 (15.19 g, 56.61 mmol), activated zinc powder (22.21 g, 339.66 mmol; Activation: To 16 g Zn suspension in 120 mL ether was added 2 mL TMSCl and stirred for 15 min, to be collected over vacuum filtration. The product was washed with ether, and air dried.), and isopropyl alcohol (32.31 mL) were added into 1M NaOH solution (290.81 mL) charged with $N_2$. The mixture was stirred at 105° C. for 24 h. The grey-pale yellow mixture was cooled down to r.t. to be diluted×3 using DI water. Solids were collected by vacuum filtration and washed with water (3 times) and methanol (2 times). Vacuum dried solids were filtered through a plug of silica with dichloromethane (1 L) as an eluent. DCM was removed under reduced pressure to give a 12.40 g of pale yellow solid (92% yield). $^1$H NMR (CDCl$_3$, 400 MHz): δ 4.09 (s, 6H), 6.72-6.74 (d, 2H), 7.36-7.40 (t, 3H), 7.55-7.58 (d, 2H), 8.31 (s, 1H), 9.24 (s, 1H) ppm; $^{13}$C NMR (CDCl$_3$, 100 MHz): δ 55.68, 101.72, 115.89, 120.38, 124.62, 125.33, 125.83, 133.07, 156.10 ppm; HRMS (DART): m/z calculated for $C_{16}H_{15}O_2^+$ (M+H$^+$) 239.1014, found 239.1027.

1,8-dimethoxy-benzenoanthracene-13,16-dione (10). 9 (13.00 g, 54.56 mmol) and 1,4-benzoquinone (8.845 g, 81.83 mmol) were added into a solution of anhydrous xylene (50 mL) charged with $N_2$. The mixture was refluxed while being stirred for two hours. The solution turned dark red upon heating. The reddish brown solution with yellow precipitates was cooled down to r.t. The yellow powder was collected using vacuum filtration. Then the powder was washed with cold toluene, hexanes, and methanol to remove black impurities and dried in vacuum oven to give a 17.56 g of light green solid (93% yield). $^1$H NMR (CDCl$_3$, 500 MHz): δ 3.03-3.09 (m, 2H), 3.80 (s, 3H), 3.88 (s, 3H), 4.79-4.80 (d, 1H), 5.82-5.83 (d, 1H), 6.26-6.31 (q, 2H), 6.64-6.66 (d, 1H), 6.73-6.75 (d, 1H), 6.80-6.82 (d, 1H), 7.00-7.04 (m, 2H), 7.10-7.14 (t, 1H) ppm; $^{13}$C NMR (CDCl$_3$, 100 MHz) δ 35.29, 48.60, 49.34, 49.49, 55.78, 56.11, 109.24, 109.63, 116.50, 117.50, 127.41, 127.59, 127.92, 129.41, 140.28, 140.74, 141.96, 144.00, 154.44, 154.96, 198.07, 199.08 ppm; HRMS (DART): m/z calculated for $C_{22}H_{19}O_4^+$ (M+H$^+$) 347.1283, found 347.1295.

Poly(methoxy-triptycene ether sulfone), x=50 (OMe-PTES (x=50, 11)). In a flamed dried two-necked round bottom flask under nitrogen atmosphere with a Dean-Stark apparatus, 10 (0.640 g, 1.85 mmol), bisphenol A (0.420 g, 1.85 mmol), and bis(4-fluorophenyl) sulfone (0.940 g, 3.70 mmol) was dissolved in anhydrous dimethylacetamide (12.0 mL) and anhydrous toluene (1.2 mL). The mixture was heated to 105° C. to fully dissolve all monomers. Then $K_2CO_3$ (1.175 g, 8.50 mmol) was added, and the reaction was heated to 165° C. for azeotropic distillation to remove water that was generated in the reaction. Once all the toluene was collected, the Dean-Stark apparatus was removed for the reaction to be refluxed for the desired time (See FIGS. 18A-18B for the relationship between reaction time to the molecular weight of the polymer). The mixture was then precipitated in boiling water drop-wise and filtered. The resulting polymer went through two more cycles of boiling in water and filtration to remove the residual base, and one more cycle in methanol to remove low molecular weight polymers. Drying afforded 1.96 g (98% yield) of a colorless polymer.

The reaction temperature of 120° C. yielded no polymer even after prolonged reaction time. Six hours of reaction at 185° C. resulted in a completely gelled product.

Poly(hydroxy-triptycene ether sulfone), x=50 (OH-PTES (x=50, 12)). In a flame-dried Schlenk flask containing a stir bar, 11 (1.50 g, 2.67 mmol) was dissolved in dichloromethane (68 mL; 2-3 hours were required for high $M_n$>100 kDa). The reaction system was cooled down to −78° C. using dry ice/acetone bath. BBr$_3$ solution in 1.0 M in dichloromethane (8.01 mL, 8.01 mmol) was added dropwise. The mixture solution was stirred at −78° C. for 30 min, then allowed to warm to r.t., while stirring for an additional 3.5 h. After the reaction, solid remains in the system. The solution was poured into methanol to precipitate the product, and the remaining solids were dissolved by adding a minimum amount of dimethylformamide. After the complete dissolution, the solution was also poured into another methanol to precipitate the product. Drying afforded a 1.31 g (87% yield) of off-white solid.

Chemical structures and $^1$H-NMR spectra (400 MHz, DMSO-d$_6$, 20° C.) of OMe-PTES (x=50), 11 and OH-PTES (x=50), 12. The disappearance of a peak at 3.42 ppm, protons from methoxy groups, green circle in 11, and appearance of a new peak at 9.43 ppm, protons from hydroxyl groups, purple circle in 12 shows completion of demethylation.

In Situ Preparation of Pyrazolium Cross-Linked Poly (Triptycene Ether Sulfone) Membranes.

Procedures: OH-PTES (x=50, 12; 0.2 g, 374 mmol) and monomers (2 and 3; See Table 4 for equivalence of each monomer for different degree of cross-linking) were dissolved in dimethylformamide (10 mL) (prolonged stirring time, >2 h, required for high $M_n$>100 kDa). Another dimethylformamide (10 mL) solution containing Et$_3$N (0.078 mL, 0.562 mmol) was added into the system. The mixture (0.01872 M) was stirred for a couple of minutes at r.t., then poured into a glass petri dish (50 mm diameter). The substitution reaction goes very fast and denser concentration (>0.03745 M) will turn the mixed solution into a gel. The petri dish containing reaction mixture was placed in a vacuum oven (VWR 1415M). With the vacuum turned on, the temperature was increased gradually from r.t. to a final temperature of 110° C. Especially, 7° C. step-wise slow increase was applied from 60 to 95° C., where dimethylformamide was mostly evaporated. At 110° C., the vacuum oven was left overnight.

The actual degree of cross-linking might can vary slightly; it can be lower than what one what is desired, considering that it is an in situ reaction. However, extensive experimental data sets (FIG. 3 and FIGS. 26-31) show that samples with different degree of cross-linking do have different properties, which originates from different cross-linking density.

Figure 18A:
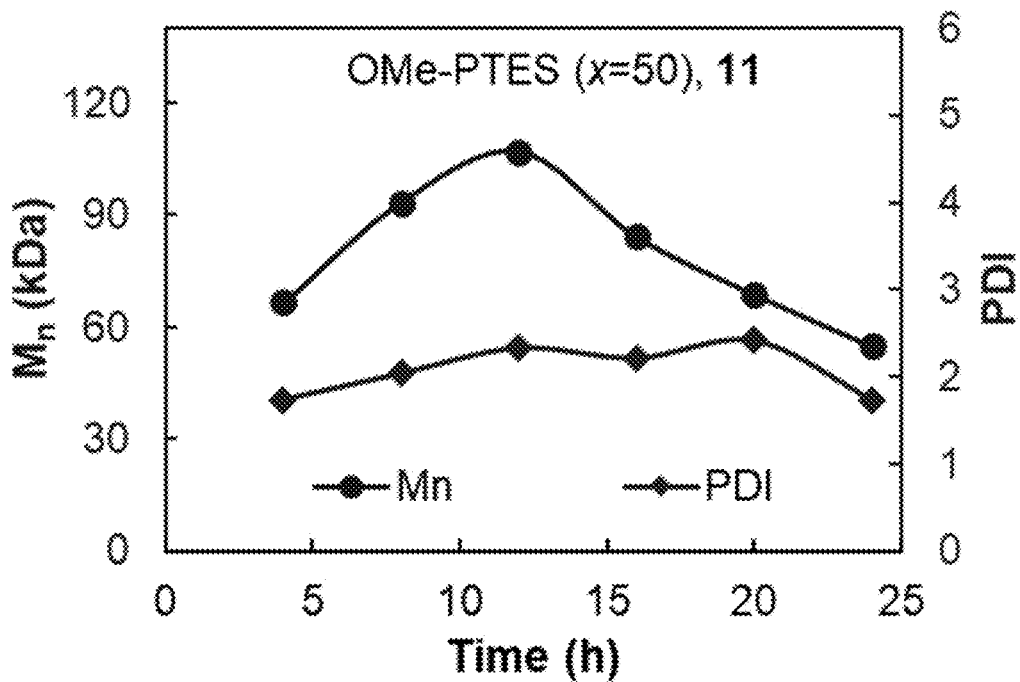
FIGS. 18A-18B show the molecular weight of poly(methoxy-triptycene ether sulfone), OMe-PTES, for x=50 and 75 as a function of reaction time where the nucleophilic aromatic substitution, S$_N$Ar, reaction temperature was set to be 165° C. for reflux, with FIG. 18A showing OMe-PTES (x=50), 11, the highest number average molecular weight, M$_n$, of 106.9 kDa (weight average molecular weight, M$_w$, of 249.9 kDa, and PDI of 2.33), which was achieved after 12 hours of reaction and FIG. 18B showing OMe-PTES (x=75), the highest M$_n$ of 82.1 kDa (M$_w$ of 203.0 kDa and PDI of 2.47), which was achieved after 16 hours of reaction, according to one set of embodiments.
Figure 18B:
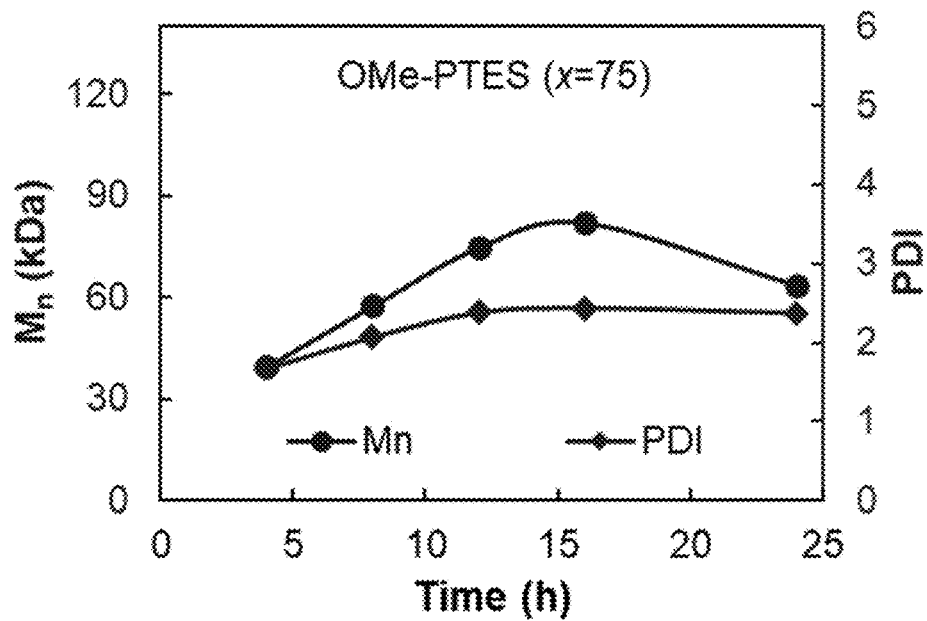

Casted films having BF$_4$ counter anions were immersed in under $N_2$-bubbled 2 M NH$_4$Cl solution at 65° C. for 3 days, to replace them to Cl$^-$; followed by immersion into $N_2$-bubbled 1 M KOH at r.t. for 1 day, to replace Cl$^-$ to OH$^-$. Finally, the hydroxide membranes were soaked into $N_2$-bubbled DI water at r.t. for 1 day, to remove access OH$^-$. No observation of F and Cl from EDX analysis supports the substitution reaction yield is nearly 100%, and counter anions are fully replaced by OH$^-$ (FIGS. 18A-18B). A table below (Table 4) shows how the degree of cross-linking and the related number of ions were calculated. Values are calculated for one repeating unit of the polymer, which has 2 eq of OH$^-$.

TABLE 4

A summary of monomers, 2 and 3, used for each degree of cross-linking.

| Degree of cross-linking (%) | # of 2 (eq) | # of 3 (eq) | Total # of Cl⁻ leaving groups (eq) | Total # of pyrazoliums (eq) |
|---|---|---|---|---|
| 100 | 1.00 | 0.00 | 2.00 | 1.00 |
| 75 | 0.75 | 0.50 | 2.00 | 1.25 |
| 40 | 0.40 | 1.20 | 2.00 | 1.60 |
| 10 | 0.10 | 1.80 | 2.00 | 1.90 |
| 0 | 0.00 | 2.00 | 2.00 | 2.00 |

Polymers having a higher fraction of triptycene were synthesized and cross-linked with pyrazoliums to cast into free-standing films. However, the inclusion of higher percent of triptycene made the membranes brittle. Interestingly, for x=50, 100% and 0% cross-linking could also result in brittle membranes. See the table (Table 5) above see working combinations of the degree of cross-linking and percent of triptycene.

TABLE 5

A summary of membrane-forming combinations of the degree of cross-linking and percent of triptycene.

|  | 100% | 75% | 40% | 10% | 0% |
|---|---|---|---|---|---|
| x = 75 | X | X | X | X | X |
| x = 63 | X | X | X | X | X |
| x = 50 | X | O | O | O | X |

EXAMPLE 9

The following example describes considerations for poly (ether sulfone), according to one set of embodiments.

Linkages in polysulfone can be hydrolyzed by the nucleophilic attack of hydroxide. Reasons why the ether bond may not be comparable to those of C—C or C—N are not fully understood. The examples showed quite a notable alkaline stability (General test condition is 1 M KOH at 80° C. for 30 days). In most cases, conductivity was only decreased by less than 10% of the initial values.

When looking at the conductivity and its alkaline stability of anion exchange membranes (AEMs) with the prevalent polymer structure, poly(ether sulfone), it was found that their properties are fairly high and stable. The conductivity of as-prepared samples was as high as or greater than 100 mS cm⁻¹. Conductivity decrease in basic solution was marginal, to be nearly zero or 10-20% of their initial values. It is noted that regardless of the backbone structures, high stability is often obtained from cross-linking of backbone polymers, meaning the design of backbone is an important factor compared simply having an ether-free backbone.

Overall alkaline stable AEM is obtained from the thoughtful design of polymer backbone together with stable cations. While keeping ion transport fast and mechanical stability high. From that perspective, this work is a step forward balancing conductivity, mechanical (swelling) stability, and chemical (alkaline) stability.

EXAMPLE 10

The following example describes computational considerations, according to some embodiments.

All calculations were performed in Orca version 3.0.3 using the RIJCOSX approximation. Geometry optimizations and numerical frequency calculations utilized the M06-2X functional and the 6-31+G* basis set. Single-point calculations used the M06-2X/6-311++G** level of theory with the SMD model for water solvation. These details and pKa calculation were taken from a previous benchmarking study on DFT calculated vs. experimental pKa for potential anion exchange moiety. The solvated Gibbs free energy (1 atm) of the heterocycles was calculated as the summation of the single-point solvated calculation and the zero-point energy and thermal corrections (298.15 K) from the gas-phase frequency calculation. The solvated Gibbs free energy (1 atm) of the proton was calculated as the summation of the gas-phase energy of a proton (−6.28 kcal/mol) and the energy of solvation of a proton (−256.9 kcal/mol); the adjustment for converting a species from gas-phase standard state (1 atm) to solution-phase standard state (1 M) was −1.89 kcal/mol. The Gibbs free energy of deprotonation (1 M) was then used to determine a predicted pKa value using Eq. S6:

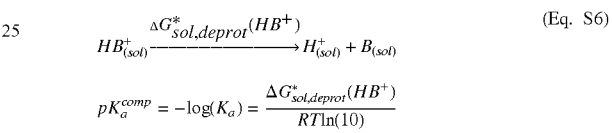

(Eq. S6)

Here calculations were done without the inclusion of water molecules. It is recognized that the inclusion of water molecules could give more accurate information on the stability of the monomers in an aqueous alkaline condition. However, in this study, the calculation method was kept to be the same as others known literature to compare pKa values of currently known.

Atomistic models were constructed using the MedeA® computational environment. All DFT calculations were performed using the NWChem package, apart from the generation of the electrostatic potential on a fine grid, which was achieved with the ORCA software. The exchange-correlation effects were described using the B3LYP hybrid functional. All geometries were optimized using Dunning's cc-pVTZ basis sets. Visualization and rendering of the electrostatic potential maps were performed using the VESTA software. The geometries of the isolated cations were obtained starting from the crosslinked systems by removing the triptycene units and terminating the cations with methyl groups. Details on the geometries can be found in FIG. 27.

A 2D Lattice Monte Carlo (2D-LMC) model was developed to study the hydroxide transport in the cross-linked polymer network based on the assumption that the ion hopping makes a predominant contribution to OH⁻ conductivity. In this LMC model, the polymer was represented by 2D grids with the size of $L_x=N_x a$ and $L_y=N_y a$, where a is the average spacing between two neighboring cationic moieties. Given a specific degree of cross-linking $d_{cross-link}$, a total of $N_x N_y (2-d_{cross-link}/100)$ anions were introduced to the system with their initial positions randomized on the grids. At a frequency of $\tau^{-1}$, the anions were allowed to attempt a jump to their adjacent sites. The success probability of the jump was given by $p_{hop}$, a function of activation energy $E_a$ and temperature T, as expressed in Eq. S7. Explicitly, the $E_a$ values for hopping between cross-linked and non-cross-linked sites were set to 9.34 kJ mol⁻¹ and 18.91 kJ mol⁻¹, which were obtained by interpolating the relationship between $d_{cross-link}$ and experimentally estimated $E_a$ at 100% and 0% cross-linking respectively (FIG. 27).

$$p_{hop} = \exp\left(-\frac{E_a}{k_B T}\right) \quad \text{(Eq. S7)}$$

Two cases were configured to be investigated in the 2D-LMC model: for the case where the cross-linkers were placed entirely randomly, its typical hopping probability distribution could be described in FIGS. 28C and 28D and FIG. 4D; while FIGS. 28A, 28B and FIG. 4B provided the hopping probability map for the other case, where all the cross-linkers were aligned to the highest degree to form the maximum number of ionic highways through the polymer network.

Figure 4F:
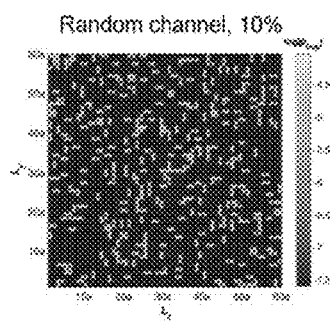
Figure 4G:
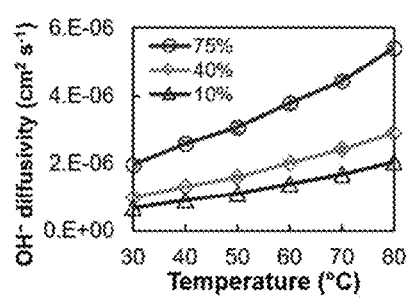
Figure 4H:
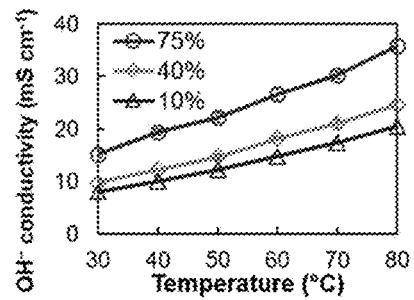

For each case, taking $N_x=N_y=60$, a=1 nm, and τ=2 ps, a series of Monte Carlo simulations were performed at T ranging from 300K to 340K, and $d_{cross-link}$ from 10% to 75%. During the simulation, the mean square displacement (MSD) of anions was collected for a time span t of 400 ns (FIG. 29), from which the OH⁻ diffusivity D was estimated using the equation D=MSD/4t (FIGS. 4D, 4F). The ionic conductivity was then calculated adopting the Nernst-Einstein equation (Eq. S8), $$\sigma = \frac{N_{anion} e^2 D}{V k_B T} \quad \text{(Eq. S8)}$$

where $N_{anion}$ is the number of anions, e is the elementary charge, V is system volume, $k_B$ is the Boltzmann constant. Calculated OH⁻ diffusivities and conductivities using the 2D-LMC model are summarized in FIGS. 4D, 4E, 4G, and 4H.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A membrane, comprising:
   a cationic polymer comprising a cationic ring;
   an anionic species configured to move within the cationic polymer; and
   a crosslinker;
   wherein a conductivity of the anionic species is at least 100 mS cm$^{-1}$,
   wherein the crosslinker crosslinks the cationic polymer, and
   wherein a water uptake of the membrane is no more than 50%.

2. The membrane of claim 1, wherein the cationic polymer comprises a poly(triptycene ether sulfone).

3. The membrane of claim 1, wherein the crosslinker comprises a pyrazolium ion or a salt thereof.

4. The membrane of claim 1, wherein the crosslinker is fully substituted.

5. The membrane of claim 1, wherein a pKa of the cationic ring of the cationic polymer/and or crosslinker is at least 16.

6. The membrane of claim 1, wherein the water uptake of the membrane is no more than 20%.

7. The membrane of claim 1, wherein the water uptake of the membrane is no more than 8%.

8. The membrane of claim 1, wherein the water uptake of the membrane is no more than 5%.

9. The membrane of claim 1, wherein the membrane is used in an electrochemical cell.

10. The membrane of claim 1, wherein the membrane is used in a fuel cell.

11. The membrane of claim 1, wherein the cationic polymer is at least 10% crosslinked by the crosslinker.

12. The membrane of claim 1, wherein the cationic polymer is at least 40% crosslinked by the crosslinker.

13. The membrane of claim 1, wherein the cationic polymer is at least 75% crosslinked by the crosslinker.

14. A method of preparing the membrane of claim 1, comprising:
    reacting a cationic polymer comprising a cationic ring with a crosslinker, wherein the crosslinker crosslinks the cationic polymer to form the membrane; and
    exposing the membrane to water;
    wherein a water uptake of the membrane is no more than 50%.

15. The method claim 14, wherein the cationic polymer comprises a poly(triptycene ether sulfone).

16. The method of claim 14, wherein the crosslinker comprises a pyrazolium ion or a salt thereof.

17. The method of claim 14, wherein the anionic species has a conductivity in the membrane of at least 100 mS cm$^{-1}$.

18. The method of claim 14, further comprising substituting C—H bonds on the cationic ring of the cationic polymer and/or the crosslinker.

19. The membrane of claim 1, wherein the cationic ring of the cationic polymer is fully substituted.

* * * * *